US012600473B1

(12) United States Patent
Bland et al.

(10) Patent No.: US 12,600,473 B1
(45) Date of Patent: Apr. 14, 2026

(54) AEROMECHANICAL LINE CLIMBER

(71) Applicant: United States of America as represented by the Administrator of NASA, Washington, DC (US)

(72) Inventors: Geoffrey Bland, Assawoman, VA (US); Joseph Bretthauer, Silver Spring, MD (US); Ted Miles, Onancock, VA (US); Kay Rufty, Boulder, CO (US); Douglas Stout, Byram Township, NJ (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 235 days.

(21) Appl. No.: 17/943,822

(22) Filed: Sep. 13, 2022

(51) Int. Cl.
| | |
|---|---|
| *B64D 1/22* | (2006.01) |
| *B64B 1/40* | (2006.01) |
| *B64C 31/06* | (2020.01) |
| *B64C 39/02* | (2023.01) |

(52) U.S. Cl.
CPC .................. *B64D 1/22* (2013.01); *B64B 1/40* (2013.01); *B64C 31/06* (2013.01); *B64C 39/022* (2013.01)

(58) Field of Classification Search
CPC ......... B64B 1/40; B64C 31/06; B64C 39/022; A66H 27/10; A66H 27/08; F41J 9/10
See application file for complete search history.

(56) References Cited

U.S. PATENT DOCUMENTS

| | | | | |
|---|---|---|---|---|
| 2,833,497 | A * | 5/1958 | Young .................. | A63H 27/087 244/155 R |
| 3,596,857 | A * | 8/1971 | Battles ................. | A63H 27/087 244/155 A |
| 3,752,424 | A * | 8/1973 | Battles ................. | A63H 27/087 244/155 R |
| 3,848,835 | A * | 11/1974 | Browning ............ | A63H 27/087 244/155 R |
| 3,968,948 | A * | 7/1976 | Schmidt ............... | A63H 27/087 244/155 R |
| 4,141,521 | A * | 2/1979 | Waldvogel ........... | A63H 27/087 244/155 R |
| 5,027,539 | A * | 7/1991 | Orsini .................... | G09F 19/02 40/415 |
| 7,934,972 | B1 * | 5/2011 | Barber .................. | A63H 33/40 446/176 |

(Continued)

*Primary Examiner* — Joshua J Michener
*Assistant Examiner* — Cindi M Curry
(74) *Attorney, Agent, or Firm* — Derek J. Langdon; Matthew F. Johnston; Trenton J. Roche

(57) ABSTRACT

Embodiments may provide a "aeromechanical line climber" device that uses aerodynamic forces and moments to alternatively ascend and descend a line, or tether, fixed to an airborne platform, such as a kite, a balloon, a blimp, an aircraft, etc. In various embodiments, an aeromechanical line climber may alternatively ascend and descend a line, or tether, fixed to an airborne platform, such as a kite, a balloon, a blimp, an aircraft, etc., without use of energy provided from an energy storage and/or generation system, such as without electrical and/or kinetic energy storage and/or generation system, and the aeromechanical line climber may alternatively ascend and descend the line, or tether, fixed to the airborne platform without use of an active control system to effect a change in lift of the aeromechanical line climber.

18 Claims, 17 Drawing Sheets

(56)                    References Cited

U.S. PATENT DOCUMENTS

| | | | |
|---|---|---|---|
| 8,196,853 B2 | 6/2012 | Bland et al. | |
| 8,678,309 B2 * | 3/2014 | Heppe | B64B 1/58 244/30 |
| 10,145,356 B1 * | 12/2018 | Nordstrom | B64F 3/02 |
| 11,806,636 B1 * | 11/2023 | Bland | A63H 27/002 |
| 2011/0278393 A1 * | 11/2011 | Bland | B64D 47/00 244/1 TD |
| 2012/0312919 A1 * | 12/2012 | Heppe | B64B 1/00 244/33 |

* cited by examiner

100

101

103

104u

—Wind Force—▶ uL uA sAW

105 sL tL pA

104l lA lL

Θ

102

106

402

300

103

Wind
Force

103

402

300

304

Travel
(Ascending)

Wind
Force

AEROMECHANICAL LINE CLIMBER

ORIGIN OF THE INVENTION

The invention described herein was made in performance of work under a NASA contract and by an employee of the United States Government and is subject to Public Law 96-517 (35 U.S.C. § 200 et seq). The contractor has not elected to retain title to the invention.

FIELD OF THE INVENTION

The present invention relates to devices that move along lines or tethers fixed to airborne platforms, and more specifically relates to devices that ascend or descend along lines or tethers fixed to airborne platforms without electrical power or active control systems contributing to the ascension or descension of the device.

BACKGROUND OF THE INVENTION

Airborne platforms, such as kites, balloons, blimps, aircraft, etc., are continually being used for weather observation and atmospheric sensing above the planet's surface. Airborne platforms may suspend instrument payloads, such as cameras, temperature sensors, pressure sensors, etc., on lines or tethers to gather data (or measurements) about the atmosphere, the planet, and/or the planetary boundary layer and associated land/atmosphere interactions. For example, suspended instrument payloads may assist in atmospheric profiling to gather thermodynamic information across a range of altitudes. To gather airborne measurements over an extended period of time, such as a period of time ranging from multiple hours to multiple days, there is a need for a system that can move a suspended instrument payload to different altitudes independently of an on-board energy storage system.

SUMMARY

Various embodiments may provide an "aeromechanical line climber" device that uses aerodynamic forces and moments to alternatively ascend and descend a line, or tether, fixed to an airborne platform, such as a kite, a balloon, a blimp, an aircraft, etc. In various embodiments, an aeromechanical line climber may alternatively ascend and descend a line, or tether, fixed to an airborne platform, such as a kite, a balloon, a blimp, an aircraft, etc., without use of energy provided from an energy storage and/or generation system, such as without electrical and/or kinetic energy storage and/or generation system, and the aeromechanical line climber may alternatively ascend and descend the line, or tether, fixed to the airborne platform without use of an active control system to effect a change in lift of the aeromechanical line climber. Rather, the aeromechanical line climber may be a passive mechanical system relying on lifting force generated by fluid flow over the aeromechanical line climber to cause the aeromechanical line climber to alternatively ascend and descend a line, or tether, fixed to an airborne platform, such as a kite, a balloon, a blimp, an aircraft, etc.

Various embodiments may include airborne system, comprising: an airborne platform; a tether connected to the airborne platform; an upper mechanical stop connected to the tether; a lower mechanical stop connected to the tether; and an aeromechanical line climber configured to moveable couple to the tether between the upper mechanical stop and the lower mechanical stop, wherein, when the airborne platform is supporting the tether aloft above a lower surface and the aeromechanical line climber is coupled to the tether and aloft above the lower surface, the aeromechanical line climber is configured to repeatedly ascend and descend the tether relative to the lower surface between the upper mechanical stop and the lower mechanical stop in response to a lifting force acting on the aeromechanical line climber and mechanical forces generated by interactions of the aeromechanical line climber with the upper mechanical stop and the lower mechanical stop. In various embodiments, the repeated ascension and descension of the aeromechanical line climber is achieved without input force created by a power generation system. In various embodiments, the repeated ascension and descension of the aeromechanical line climber is achieved without input force controlled by an active control system Various embodiments may include an aeromechanical line climber, comprising: a lifting surface; a line attachment system configured to moveably couple the aeromechanical line climber to a tether; and a hinged connection configured to enable the lifting surface to pivot and change an angle of attack of the lifting surface when the aeromechanical line climber is coupled to the tether and aloft between an upper mechanical stop on the tether and a lower mechanical stop on the tether, wherein, while the aeromechanical line climber is coupled to the tether and aloft between the upper mechanical stop on the tether and the lower mechanical stop on the tether, the aeromechanical line climber is configured to repeatedly ascend and descend the tether between the upper mechanical stop and the lower mechanical stop in response to a lifting force acting on the lifting surface and mechanical forces generated by interactions of the aeromechanical line climber with the upper mechanical stop and the lower mechanical stop. In various embodiments, the aeromechanical line climber does not include a power generation system providing input force to the ascension and the descension of the aeromechanical line climber and the aeromechanical line climber does not include an active control system controlling the ascension and the descension of the aeromechanical line climber.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
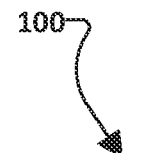
FIG. 1 is a component block diagram of an airborne system according to various embodiments including an embodiment aeromechanical line climber device that uses aerodynamic forces and moments to alternatively ascend and descend a line, or tether, fixed to an airborne platform.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein the term "lifting structure" refers to a heavier-than-air airfoil structure over which fluid flow generates lift force acting on the lifting structure. Lifting structures may be airfoil structures of various geometries, such as wings, sails, etc. The term "heavier-than-air" as used herein is intended to mean a component weighs more than the fluid it displaces, and is not intended to be limited to any specific atmospheric composition.

As used herein, terms such as "heavier-than-air", "ground", "surface", etc., are not intended to limit the various embodiments to usage on Earth, and the systems discussed herein may be applicable to usage on planets other than Earth having an atmosphere and/or moons having an atmosphere. As such, the various embodiments may find applicability in both terrestrial and interplanetary exploration and measurement.

As used herein, an airborne platform may be any platform that is held aloft in an atmosphere, whether heavier-than-air or lighter-than-air, and the term airborne platform is not intended to limit the disclosure to any specific type of airborne platform. Examples of airborne platforms may include kites, balloons, blimps, aircraft, etc.

Atmospheric profiling to gather thermodynamic information across a range of altitudes is an important capability needed to help the understanding of the planetary boundary layer and associated land/atmosphere interactions. To gather these measurements over an extended period, from hours to days, a system that can operate independently of on-board energy storage may be helpful.

Various embodiments may provide an "aeromechanical line climber" device that uses aerodynamic forces and moments to alternatively ascend and descend a line, or tether, fixed to an airborne platform, such as a kite, a balloon, a blimp, an aircraft, etc. The aeromechanical line climber is intended to continuously climb and descend between prescribed locations on a pilot kite-line, providing there is sufficient wind. The aeromechanical line climber may be sized to carry a variety of instrumentation, such as currently included in kite-based, tethered-balloon, or uncrewed aircraft systems in use for similar observations. The objective of aeromechanical line climber may be to minimize power requirements and complex active control systems.

In various embodiments, an aeromechanical line climber may alternatively ascend and descend a line, or tether, fixed to an airborne platform, such as a kite, a balloon, a blimp, an aircraft, etc., without use of energy provided from an energy storage and/or generation system, such as without electrical and/or kinetic energy storage and/or generation system, and the aeromechanical line climber may alternatively ascend and descend the line, or tether, fixed to the airborne platform without use of an active control system to effect a change in lift of the aeromechanical line climber. Rather, the aeromechanical line climber may be a passive mechanical system relying on lifting force generated by fluid flow over the aeromechanical line climber to cause the aeromechanical line climber to alternatively ascend and descend a line, or tether, fixed to an airborne platform, such as a kite, a balloon, a blimp, an aircraft, etc.

The aeromechanical line climber is a kite "line climber" that uses aerodynamic forces and moments to control the configuration for climb, and alternatively, descent. An advantage of the aeromechanical line climber may be that an aeromechanical line climber requires no electrical power or active control system to effect a change in lift, but rather uses mechanical stops placed on the line (or tether) of the airborne platform (e.g., a kite, a balloon, etc.) supporting the line (or tether) that trigger a rotation of the lifting surface of the aeromechanical line climber. This change in the attitude of the lifting surface is such that the sense of lift force is reversed, i.e., that if the aeromechanical line climber is lifting upward and climbing, the mechanical stop will initiate an aerodynamically driven change of lifting surface attitude to create less/downward lift to accomplish a descent and, similarly, a mechanical stop lower on the line will initiate an aerodynamically driven change of lifting surface attitude to create more/upward lift to accomplish a climb. In the various embodiments, this sequence of lifting upward and climbing, followed by descent, followed by lifting upward and climbing may persist repeatedly under the wind forces alone, without external power.

In various embodiments, an aeromechanical line climber may include a lifting surface, such as rigid wing or sail. This lifting surface may be associated with a line attachment system that allows the lifting surface to pivot in the pitch axis, i.e., leading-edge-up and leading-edge-down to effect changes in lift. This change in pitch attitude may be initiated via a mechanical stop which translates the lifting force into a rotational moment of the surface. An upper mechanical stop may be located at a selected maximum climb point on the tether (or line) and a lower mechanical stop may be located at a selected maximum descent point on the tether. The aeromechanical line climber may climb and descend repeatedly between the upper mechanical stop and the lower mechanical stop. In various embodiments, the rotation location of the aeromechanical line climber may be aft of the center of aerodynamic forces of the lifting surface, such that a natural tendency to pitch up or pitch down may be inherent in the aeromechanical line climber. Mechanical stops on the pivot may prevent over rotation beyond an effective aerodynamic range. The aeromechanical line climber may include a line attachment system, such as clips, hooks, etc.

In various embodiments, an aeromechanical line climber may be well suited for unattended or minimally attended operations. This capability may support atmospheric measurements over periods of hours to days. As an aeromechanical line climber relies on wind for functionality, an aeromechanical line climber be particularly suitable for oceanic environments (towed from a ship for example) or conditions were a small, quasi-disposable system that may provide valuable information, such as severe storm development and passage. An advantage of the aeromechanical line climber may be that an electronic control system is not required, and manufacturing costs therefore may be merely driven by the structure itself, and not a motor or control system.

FIG. 1 is a component block diagram of an airborne system 100 according to various embodiments including an embodiment aeromechanical line climber device 105 that uses aerodynamic forces and moments to alternatively ascend and descend a tether 103 (or flight line 103), fixed to an airborne platform 101. The aeromechanical line climber 105 may be a line climber device having a lifting surface, such as rigid wing or sail. As illustrated in FIG. 1, an aeromechanical line climber 105 may be a symmetrical airfoil, however such configuration of the aeromechanical line climber 105 is provided merely as an example to illustrate aspects of the various embodiments, and other geometries of airfoils may be substituted for the symmetrical airfoil in the various example discussed herein and aeromechanical line climbers according to the various embodiments are not limited to symmetrical airfoils. The lifting surface of the aeromechanical line climber 105 may be attached to a line attachment system moveably coupled to the tether 103 that allows the lifting surface to pivot in the pitch axis, i.e., leading-edge-up and leading-edge-down to effect changes in lift force on the aeromechanical line climber 103.

The system 100 may include an anchor system 102, such as a winch, spindle, reel, clip, etc. The anchor system 102 may be positioned on a surface 106, such as planetary surface (e.g., the surface of Earth or the surface of another planet), a structural surface (e.g., a roof, a ship, a tower, etc.) or any other type surface. The tether 103 may be a cable, a wire, a line, etc., connected between an attachment point of the airborne platform 101 and the anchor system 102. For example, the airborne platform 101 may be a kite, a balloon, a blimp, an aircraft, or any other type structure aloft above a surface 106 at an altitude "pA". The airborne platform 101 may operate at various different altitudes and the value of "pA" may be from a few feet above the surface 106 to many thousands of feet, such as 18,000 feet above the surface 106 or higher. Wind Force is illustrated in FIG. 1 blowing in a direction from the left of the figure to the right of the figure parallel to the surface 106 for easy of illustration.

The tether 103 may extend a tether length "tL" from the anchor system 102 and the line angle $\theta$ may be the angle between the surface 106 and the tether 103. The tether length "tL" may be the different than the altitude "pA". In various embodiments, an upper mechanical stop 104u may be attached to the tether 103 at an attachment point that is a selected length "uL" from the attachment point of the tether 103 to the airborne platform 101. In various embodiments, a lower mechanical stop 104l may be attached to the tether 103 at an attachment point that is a selected length "lL" from the attachment point of the tether 103 to the attachment point, or payout point, of the anchor system 102. The distance between the upper mechanical stop 104u and the lower mechanical stop 104l may be a station length "sL". The upper mechanical stop 104u and the lower mechanical stop 104l may be mechanical stops that translate the lifting force of the aeromechanical line climber 105 into a rotational moment of the lifting surface of the aeromechanical line climber 105 to pivot the lifting surface in the pitch axis, i.e., leading-edge-up or leading-edge-down, to effect changes in lift force on the aeromechanical line climber 103.

In various embodiments, the airborne platform 101 and anchor system 102 may be controlled such that based on the attachment point to the tether 103 of the upper mechanical stop 104u, the tether length "tL", and the line angle $\theta$, the upper mechanical stop 104u is held at a selected upper altitude "uA" that may represent a selected highest climb altitude for the aeromechanical line climber 105 above the surface 106. Similarly, the airborne platform 101 and anchor system 102 may be controlled such that based on the attachment point to the tether 103 of the lower mechanical stop 104l, the tether length "tL", and the line angle $\theta$, the lower mechanical stop 104l is held at a selected lower altitude "lA" that may represent a selected lowest descent altitude for the aeromechanical line climber 105 above the surface 106. The difference between the "uA" and the "lA" may be a station altitude window "sAW" that may be the altitude window between which the aeromechanical line climber 105 ascends and descends. The aeromechanical line climber 105 may climb and descend repeatedly between the upper mechanical stop 104u and the lower mechanical stop 104l. In this manner, the aeromechanical line climber 105 may climber and descend repeatedly through the station altitude window "sAW". In embodiments in which the aeromechanical line climber 105 includes an instrument system, such as an instrument system including sensors for wind speed and direction, pressure, Global Positioning System (GPS), temperature, humidity, imagers, atmospheric particle detectors, and/or gas detectors, the ascent and descent of the aeromechanical line climber 105 through the station altitude window "sAW" may enable the instrument system to gather data at different altitudes. In various embodiments, the aeromechanical line climber 105 may ascend and descend repeatedly through the station altitude window "sAW" without being powered or generating force itself to increase or decrease the lift of the lifting surface. In various embodiments, the aeromechanical line climber 105 may ascend and descend repeatedly through the station altitude window "sAW" use of energy provided from an energy storage and/or generation system, such as without electrical and/or kinetic energy storage and/or generation system. In various embodiments, the aeromechanical line climber 105 may ascend and descend repeatedly through the station altitude window "sAW" without use of energy provided from an energy storage and/or generation system, such as without electrical and/or kinetic energy storage and/or generation system. In various embodiments, the aeromechanical line climber 105 may ascend and descend repeatedly through the station altitude window "sAW" without use of an active control system to effect a change in lift of the aeromechanical line climber 105. Rather, the aeromechanical line climber 105 may be a passive mechanical system relying on lifting force generated by fluid flow over the aeromechanical line climber 105 to cause the aeromechanical line climber 105 to alternatively ascend and descend the tether 103 in the station altitude window "sAW".

FIGS. 2A-2F are block diagrams illustrating aspects of the aeromechanical line climber 105 ascending and descending the tether 103 in accordance with various embodiments. With reference to FIGS. 1-2F, FIG. 2A illustrates the aeromechanical line climber 105 in a first position relative to the wind force in which the lifting surface leading edge is pitched up away from the surface 106 at an angle of attack $\alpha$. The angle of attack $\alpha$ may be set by a mechanical stop of the aeromechanical line climber 105 configured to allow a fixed maximum physical stop angle of A relative to the tether 103. The resultant lift may be in a direction up away from the surface 106. As such, the aeromechanical line climber 105 may be climbing along the tether 103 toward the upper mechanical stop 104u. The distance in altitude from the aeromechanical line climber 105 to the upper mechanical stop 104*u* in FIG. 2A may be "Du" and the distance along the tether 103 to the upper mechanical stop 104*u* may be "Lu". The distance in altitude from the aeromechanical line climber 105 to the lower mechanical stop 104*l* in FIG. 2A may be "Dd" and the distance along the tether 103 to the lower mechanical stop 104*l* may be "Lu". The aeromechanical line climber 105 may be climbing such that the distances "Du" and "Lu" are decreasing due to the lift force and the distances "Dd" and "Ld" are getting larger due to the lift force.

Figure 2A:
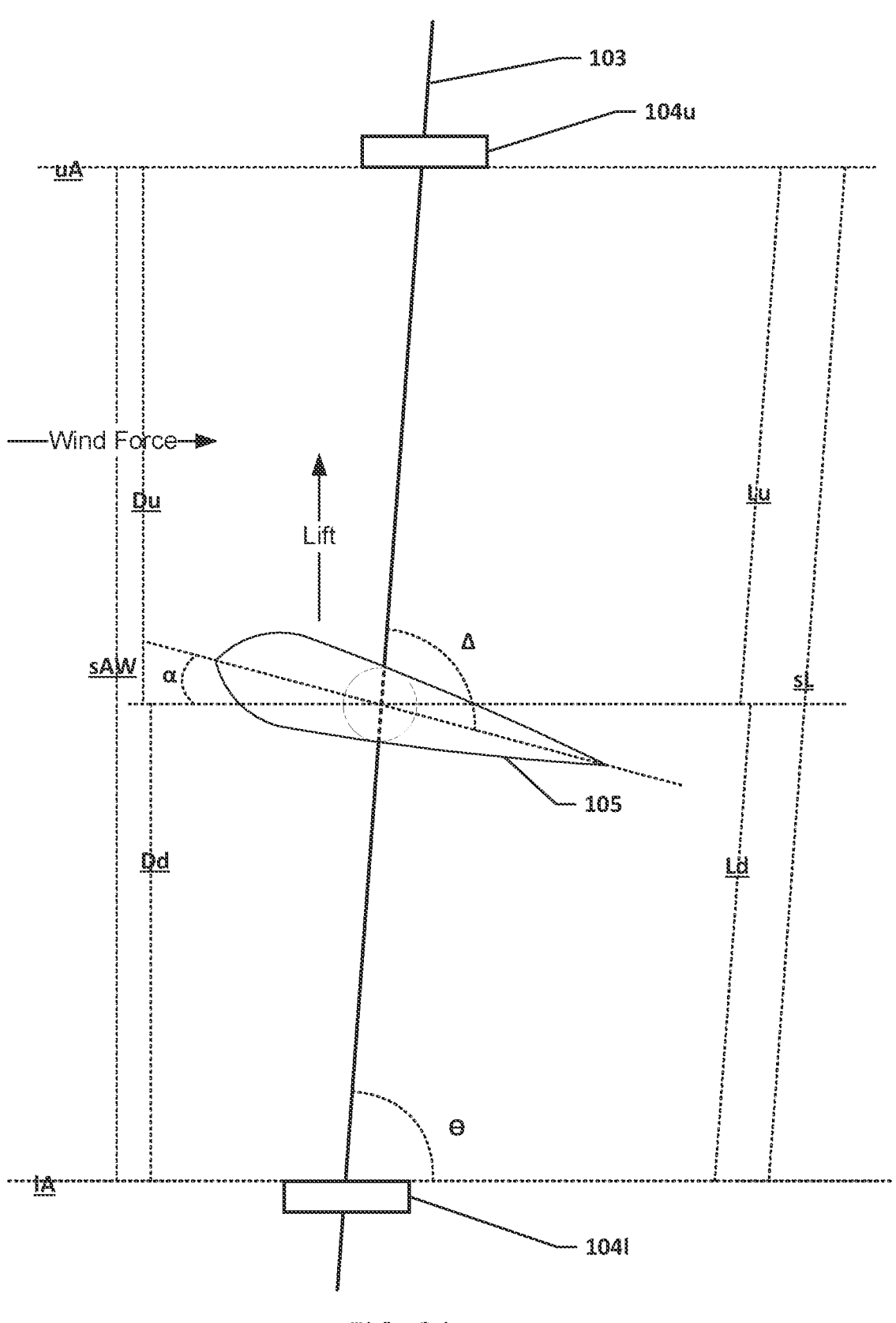
FIGS. 2A-2F are block diagrams illustrating aspects of an aeromechanical line climber ascending and descending a line, or tether, fixed to an airborne platform in accordance with various embodiments.
Figure 2B:
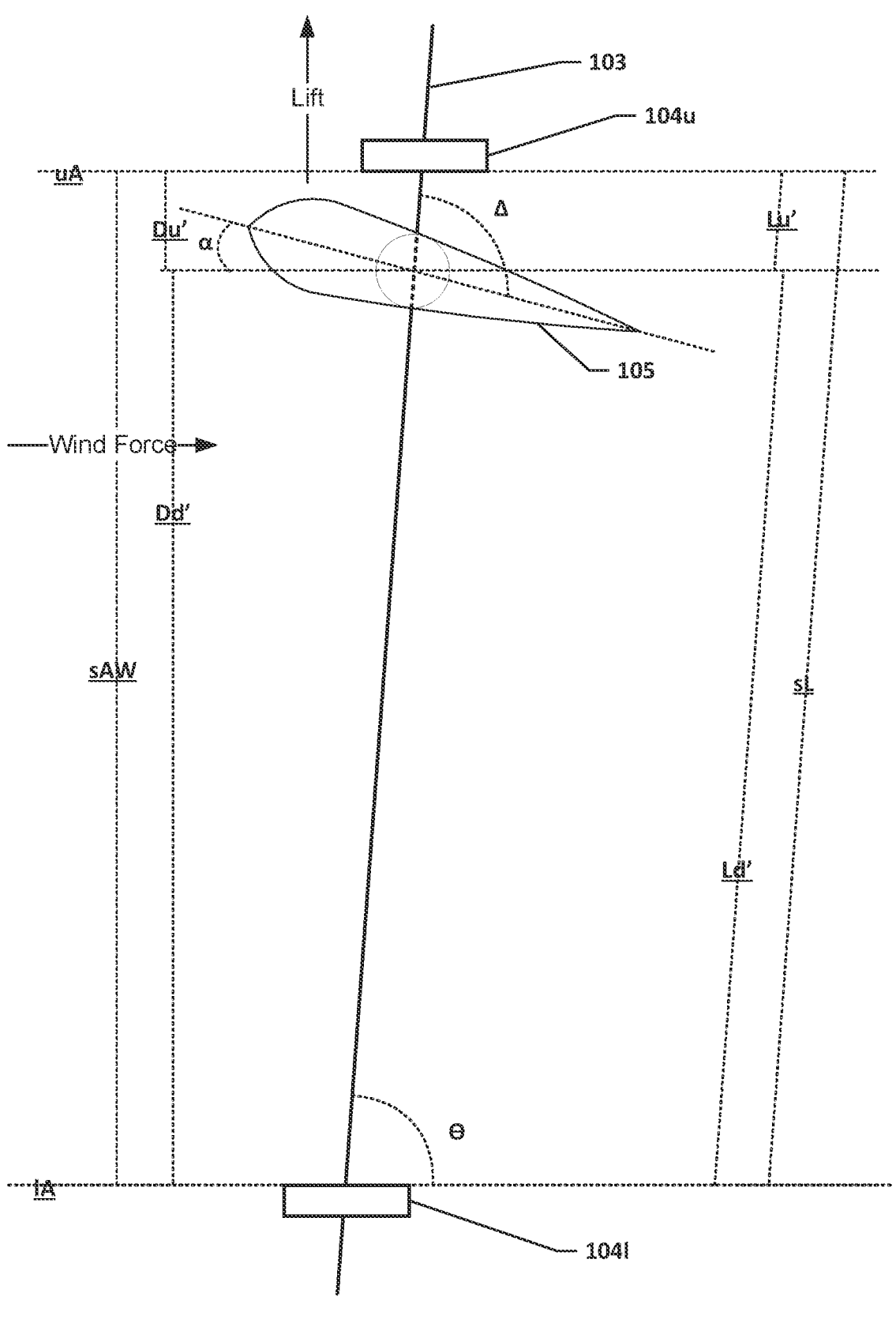

FIG. 2B illustrates the aeromechanical line climber 105 at a second position at a time later than that illustrated in FIG. 2A in which the lifting surface leading edge is pitched up away from the surface 106 at an angle of attack α. The distance in altitude from the aeromechanical line climber 105 to the upper mechanical stop 104*u* in FIG. 2B may be "Du'" and the distance along the tether 103 to the upper mechanical stop 104*u* may be "Lu'". The distance in altitude from the aeromechanical line climber 105 to the lower mechanical stop 104*l* in FIG. 2B may be "Dd'" and the distance along the tether 103 to the lower mechanical stop 104*l* may be "Lu'". In FIG. 2B, the aeromechanical line climber 105 may have climbed relative to its position in FIG. 2B such that the distances "Du'" and "Lu'" are less than the distances "Du" and "Lu" and the distances "Dd'" and "Ld'" are greater than the distances "Dd" and "Ld".

The aeromechanical line climber 105 may continue to climb until the aeromechanical line climber 105 interacts with the upper mechanical stop 104*u* and the resultant mechanical force from the aeromechanical line climber 105 interacting with the upper mechanical stop 104*u* causes the pitch of the lifting surface of the aeromechanical line climber 105 to change from a pitched up away from surface 106 state to a pitched down toward the surface 106 state. The moment force imparted by the upper mechanical stop 104*u* on the aeromechanical line climber 105 may pivot the lifting surface of the aeromechanical line climber 105 around a pivot point to change the angle of attack of the lifting surface of the aeromechanical line climber 105.

Figure 2C:
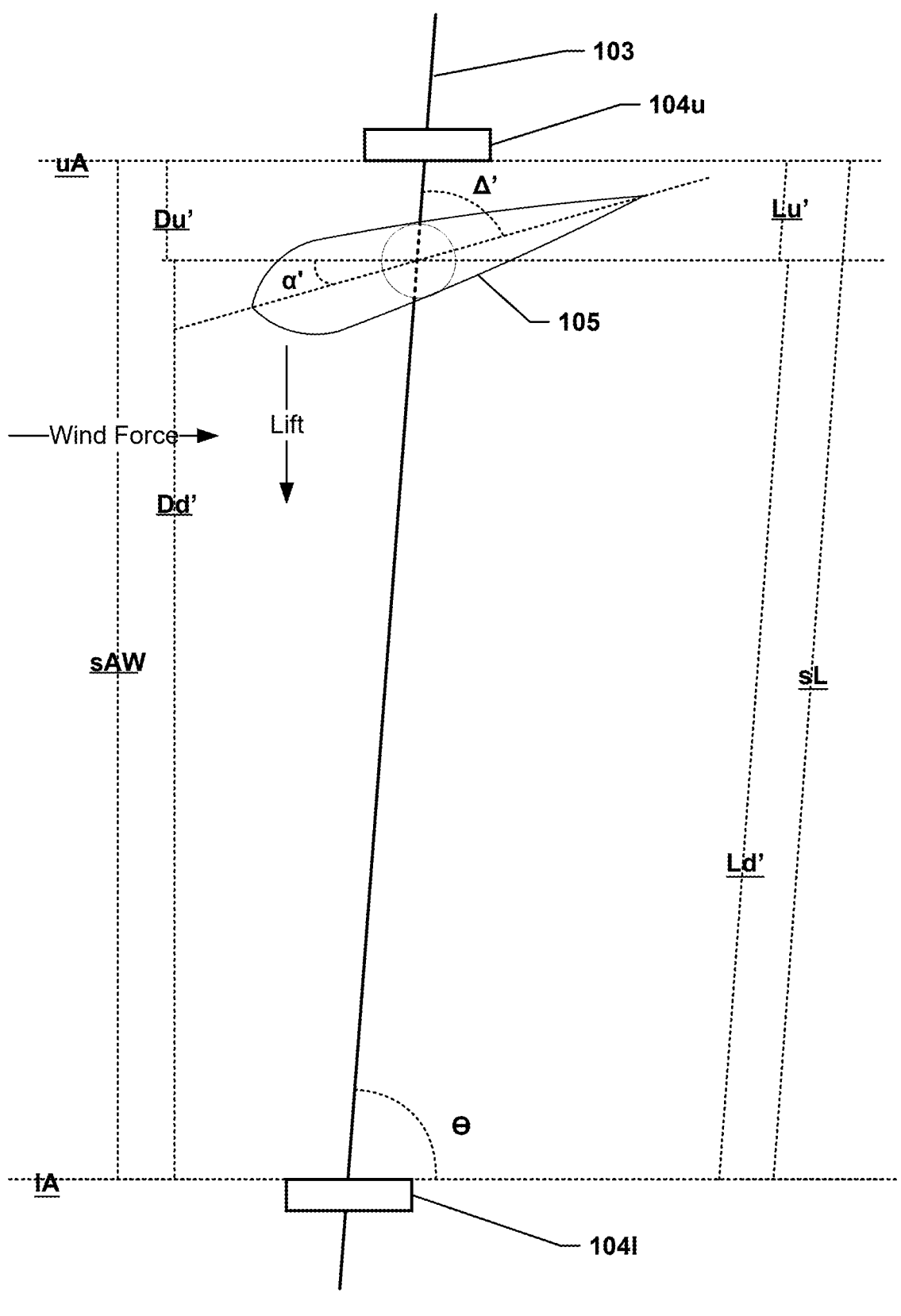

FIG. 2C illustrates the aeromechanical line climber 105 at a third position at a time later than that illustrated in FIG. 2B in which the lifting surface leading edge is pitched down toward the surface 106 at an angle of attack α'. The point along the tether 103 of the aeromechanical line climber 105 in FIG. 2C may be the same as the point along the tether 103 in FIG. 2B as the aeromechanical line climber 105 may have descended to that point after interacting with the upper mechanical stop 104*u*. In FIG. 2C, the wind force may be the same as in FIGS. 2A and 2B, but as the angle of attack α' may be pitched down, the aeromechanical line climber 105 may be experiencing a lifting force in the downward direction toward the surface 106 (i.e., opposite the lifting force direction of FIGS. 2A and 2B). The angle of attack α' may be set by a mechanical stop of the aeromechanical line climber 105 configured to allow a fixed maximum physical stop angle of Δ' relative to the tether 103. The resultant lift may be in a direction down toward the surface 106. The distance in altitude from the aeromechanical line climber 105 to the upper mechanical stop 104*u* in FIG. 2C may be "Du'" and the distance along the tether 103 to the upper mechanical stop 104*u* may be "Lu'". The distance in altitude from the aeromechanical line climber 105 to the lower mechanical stop 104*l* in FIG. 2C may be "Dd'" and the distance along the tether 103 to the lower mechanical stop 104*l* may be "Lu'". In FIG. 2C, the aeromechanical line climber 105 may be descending such that the distances "Du'" and "Lu'" are increasing due to the lift force downward toward the surface 106 and the distances "Dd'" and "Ld'" are getting smaller due to the lift force downward toward the surface 106.

Figure 2D:
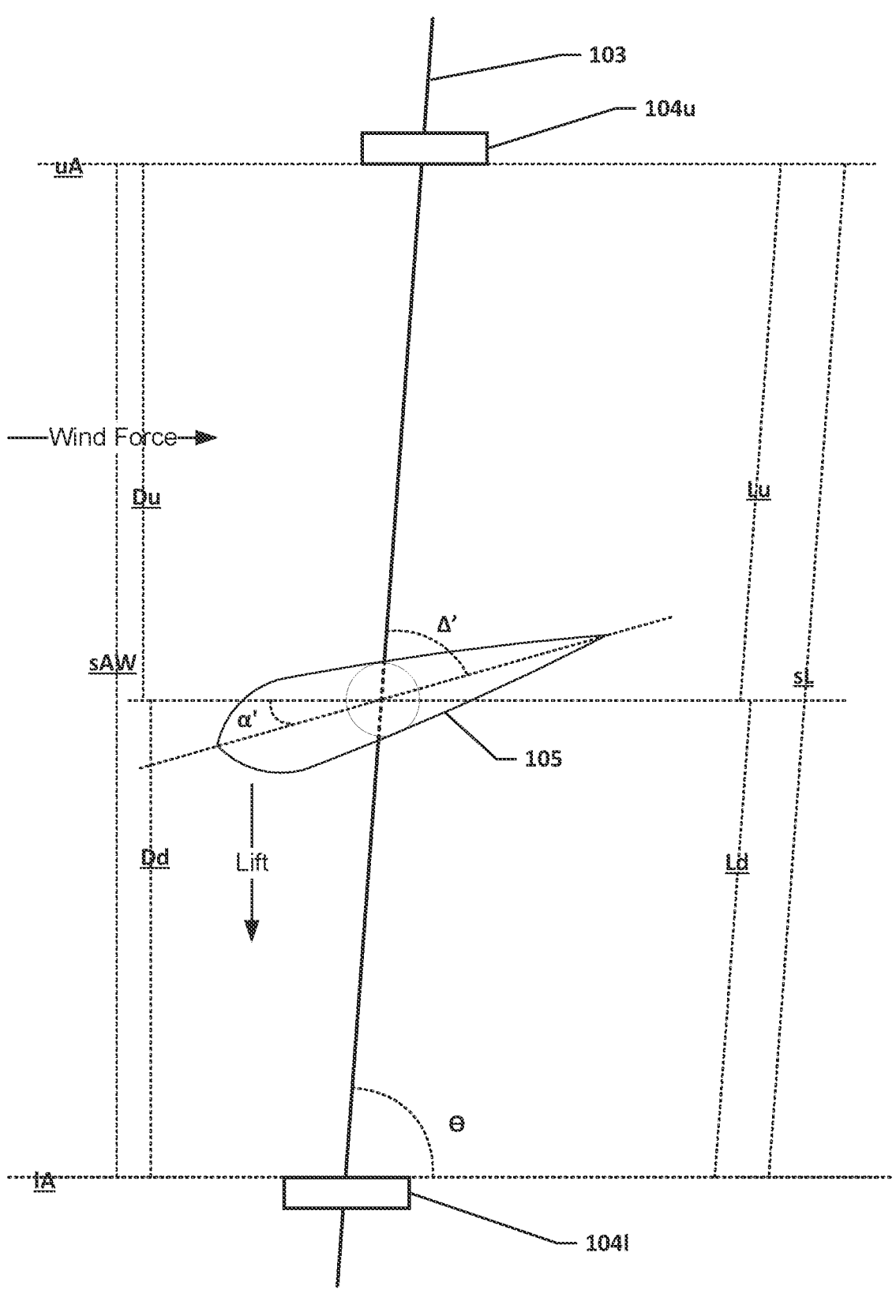

In FIG. 2D, the aeromechanical line climber 105 may have descended relative to its position in FIG. 2C such that the distances "Du" and "Lu" are greater than the distances "Du'" and "Lu'" and the distances "Dd" and "Ld" are less than the distances "Dd'" and "Ld'". The point along the tether 103 of the aeromechanical line climber 105 in FIG. 2D may be the same as the point along the tether 103 in FIG. 2A as the aeromechanical line climber 105 may have descended to that point from the point illustrated in FIG. 2C. FIG. 2D may illustrate a time later than that illustrated in FIG. 2C. In FIG. 2D, the wind force may be the same as in FIGS. 2A-2C.

Figure 2E:
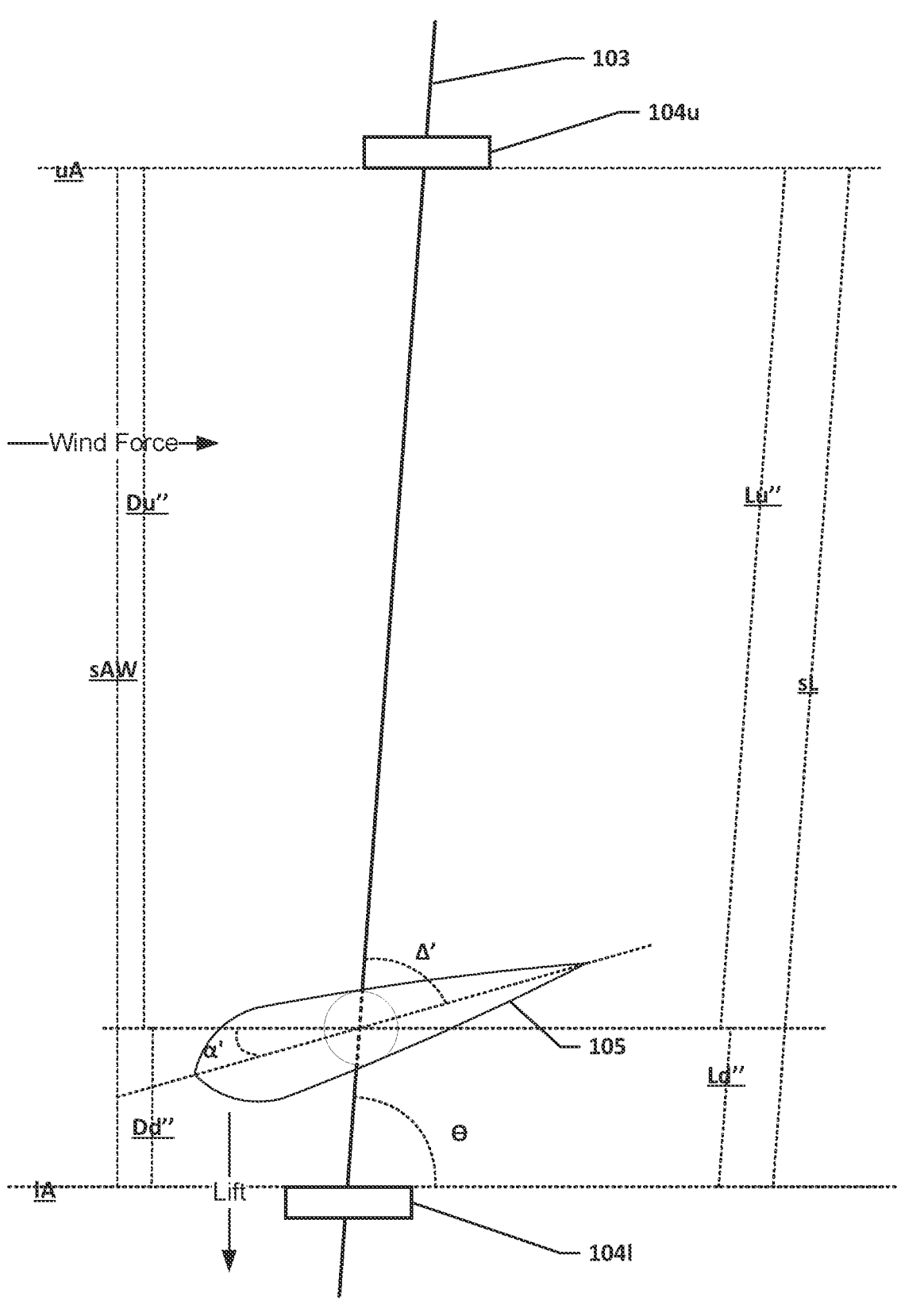

In FIG. 2E, the aeromechanical line climber 105 may have descended relative to its position in FIG. 2D such that the distances "Du''" and "Lu''" are greater than the distances "Du" and "Lu" and the distances "Dd''" and "Ld''" are less than the distances "Dd" and "Ld". The aeromechanical line climber 105 may have descended to the point on the tether illustrated in FIG. 2E from the point illustrated in FIG. 2D. FIG. 2E may illustrate a time later than that illustrated in FIG. 2D. In FIG. 2E, the wind force may be the same as in FIGS. 2A-2C.

The aeromechanical line climber 105 may continue to descend until the aeromechanical line climber 105 interacts with the lower mechanical stop 104*l* and the resultant mechanical force from the aeromechanical line climber 105 interacting with the lower mechanical stop 104*l* causes the pitch of the lifting surface of the aeromechanical line climber 105 to change from a pitched down toward the surface 106 state to a pitched up away from the surface 106 state. The moment force imparted by the lower mechanical stop 104*l* on the aeromechanical line climber 105 may pivot the lifting surface of the aeromechanical line climber 105 around a pivot point to change the angle of attack of the lifting surface of the aeromechanical line climber 105.

Figure 2F:
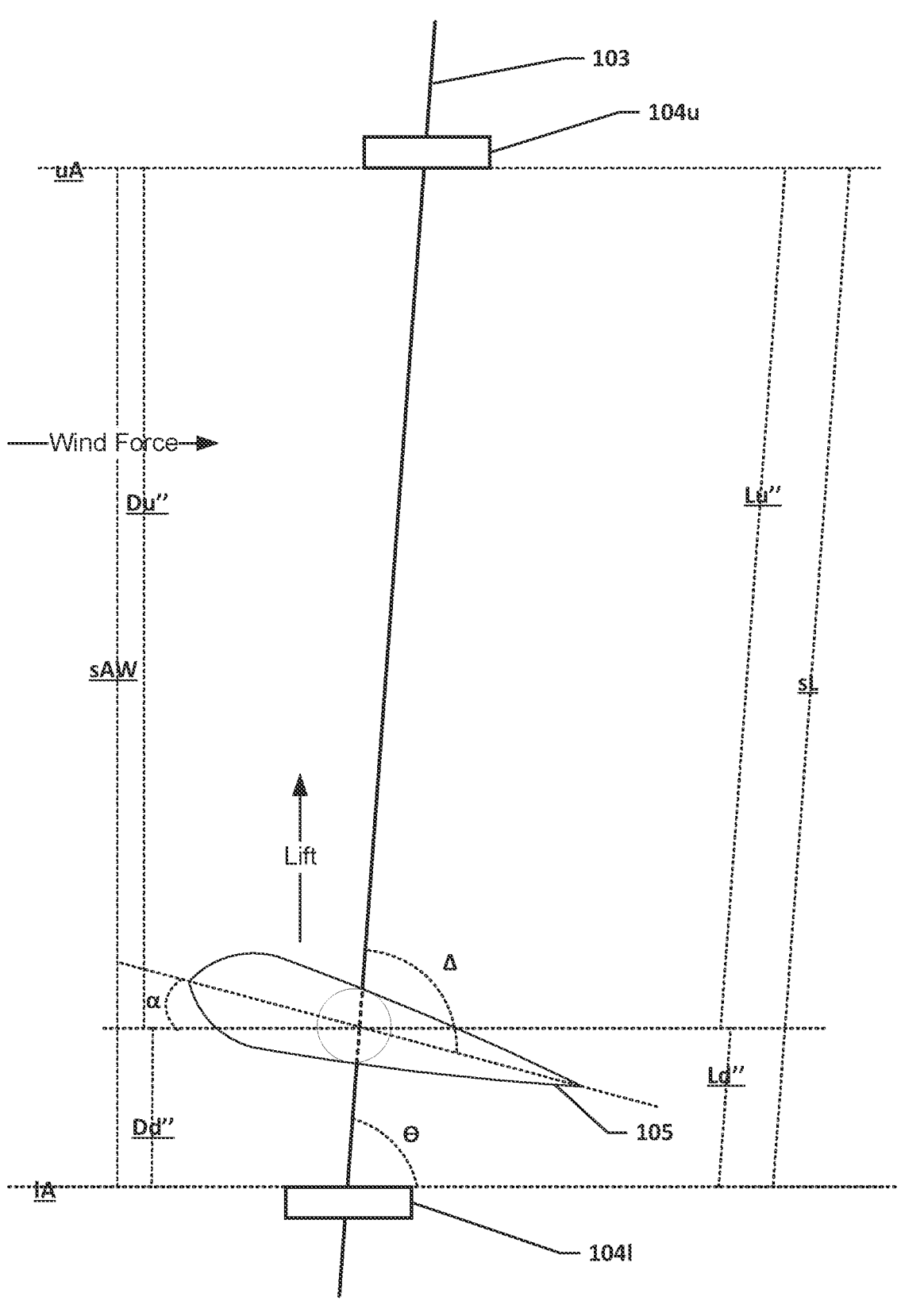

FIG. 2F illustrates the aeromechanical line climber 105 at a sixth position at a time later than that illustrated in FIG. 2E in which the lifting surface leading edge is pitched up toward the surface 106 at an angle of attack α again. The point along the tether 103 of the aeromechanical line climber 105 in FIG. 2F may be the same as the point along the tether 103 in FIG. 2E as the aeromechanical line climber 105 may have climbed to that point after interacting with the lower mechanical stop 104*l*. In FIG. 2F, the wind force may be the same as in FIGS. 2A-2E, but as the angle of attack α may be pitched up, the aeromechanical line climber 105 may be experiencing a lifting force in the upward direction away from the surface 106 (i.e., opposite the lifting force direction of FIGS. 2C-2E). The angle of attack α may be set by a mechanical stop of the aeromechanical line climber 105 configured to allow a fixed maximum physical stop angle of A relative to the tether 103. The resultant lift may be in a direction up away from the surface 106. The distance in altitude from the aeromechanical line climber 105 to the upper mechanical stop 104*u* in FIG. 2F may be "Du''" and the distance along the tether 103 to the upper mechanical stop 104*u* may be "Lu''". The distance in altitude from the aeromechanical line climber 105 to the lower mechanical stop 104*l* in FIG. 2F may be "Dd''" and the distance along the tether 103 to the lower mechanical stop 104*l* may be "Lu''". In FIG. 2F, the aeromechanical line climber 105 may be ascending (or climbing) such that the distances "Du''" and "Lu''" are decreasing due to the lift force upward away from the surface 106 and the distances "Dd'''" and "Ld'''" are getting larger due to the lift force upward away from the surface 106.

In various embodiments, the aeromechanical line climber 105 may repeatedly and sequentially move through the positions and orientations illustrated in FIGS. 2A-2F while the wind force remains sufficient for the lifting surface of the aeromechanical line climber 105 to generate lift to move the aeromechanical line climber 105 along the tether 103. In this manner, the aeromechanical line climber 105 may oscillate between the upper mechanical stop 104*u* and the lower mechanical stop 104*l* passing through the station altitude window "sAW". The aeromechanical line climber 105 may oscillate between the upper mechanical stop 104*u* and the lower mechanical stop 104*l* passing through the station altitude window "sAW" without any onboard power source or any power generation system supplying force to assist in the oscillation between the upper mechanical stop 104*u* and the lower mechanical stop 104*l* or any onboard power source or any power generation system supplying force to adjust the pitch of the lifting surface leading edge, such as back and forth between the angle of attack α and α'.

Figure 3A:
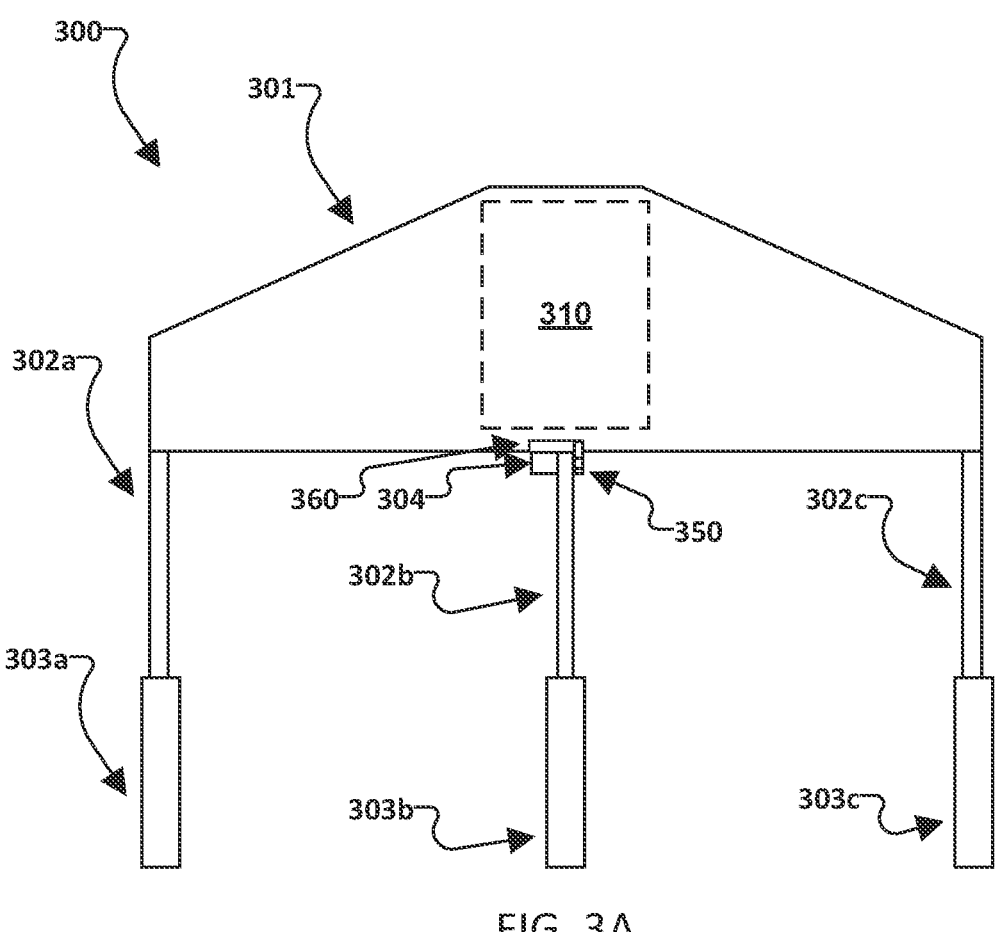
FIGS. 3A-3H are block diagrams of an example aeromechanical line climber in accordance with various embodiments.
Figure 3B:
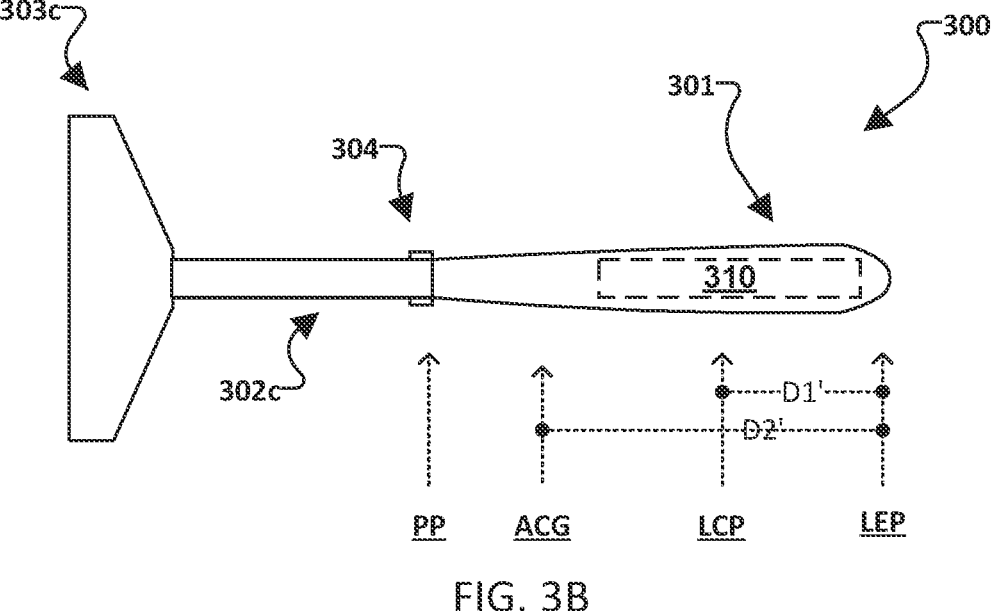
Figure 3C:
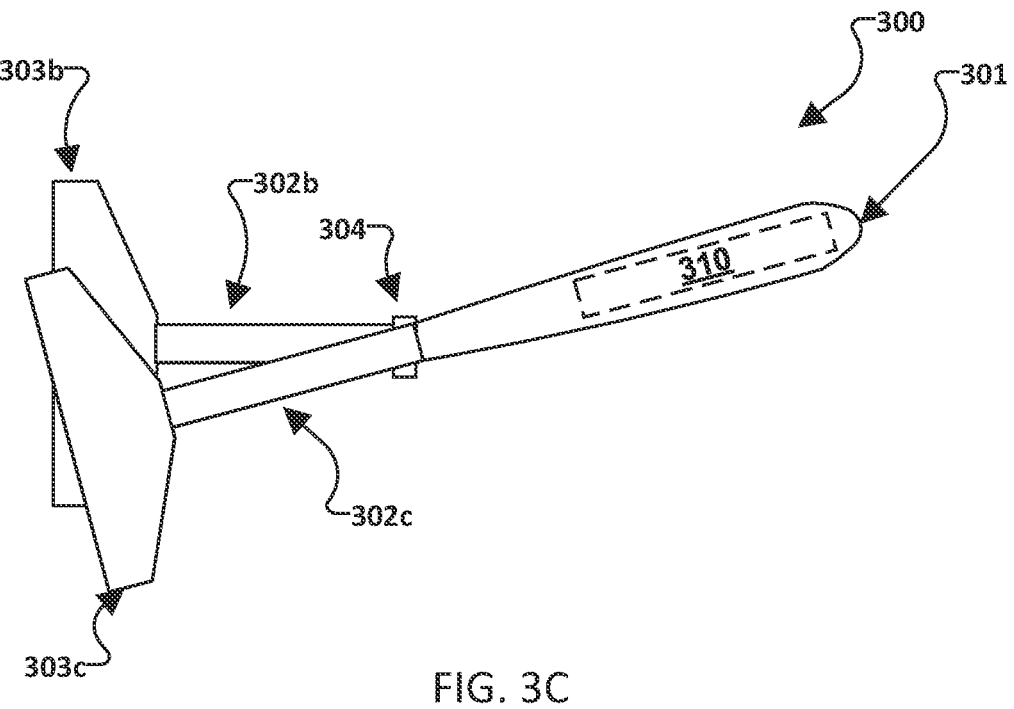
Figure 3D:
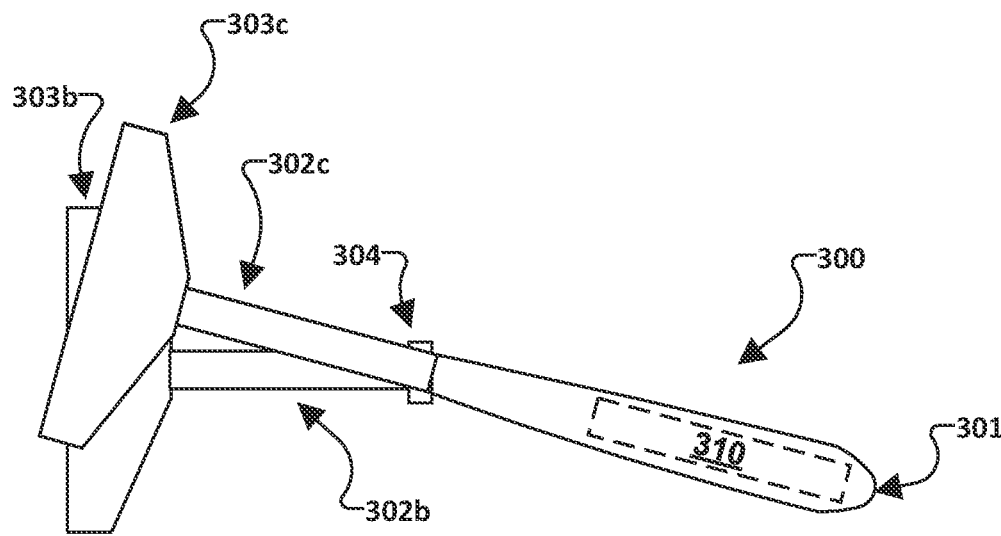
Figure 3E:
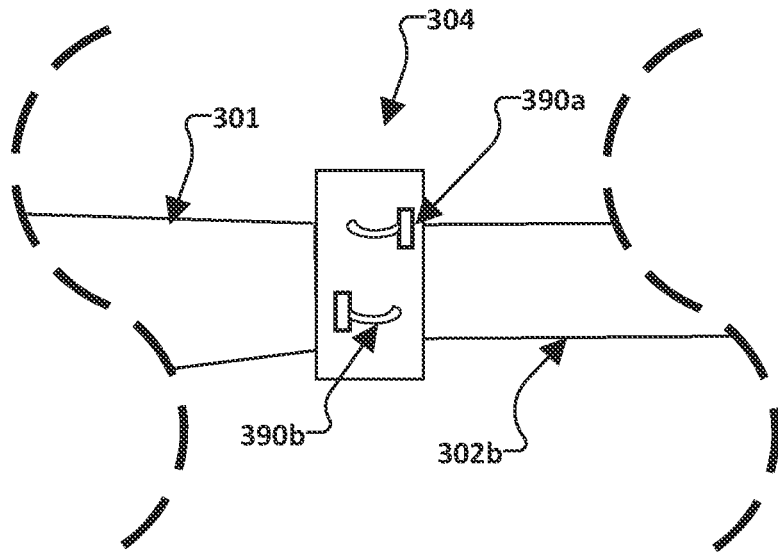
Figure 3F:
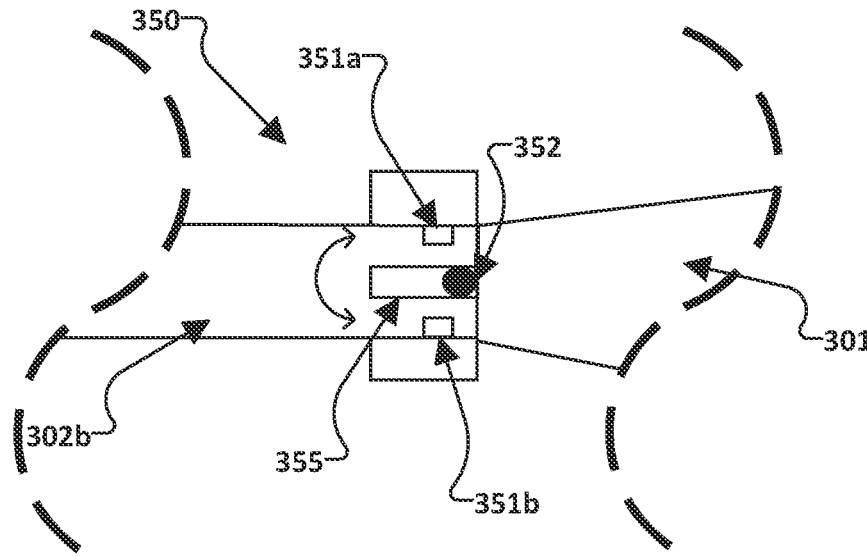
Figure 3G:
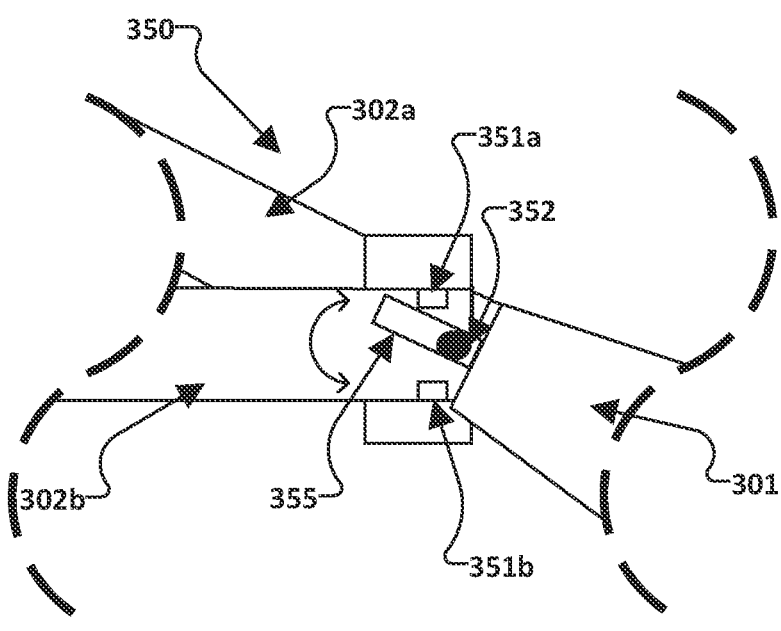
Figure 3H:
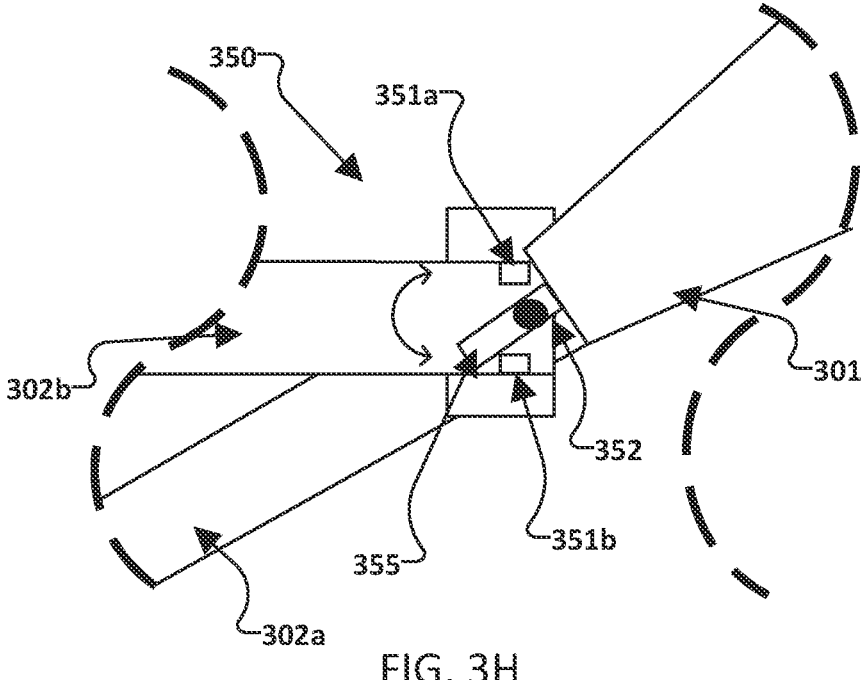

FIGS. 3A-3H are block diagrams of an example aeromechanical line climber 300 in accordance with various embodiments. With reference to FIGS. 1-3H, the example aeromechanical line climber 300 is an example of one configuration of an aeromechanical line climber (e.g., aeromechanical line climber 100) in accordance with various embodiments, and other configurations of aeromechanical line climbers may be substituted for aeromechanical line climber 300 without departing from the various embodiments. aeromechanical line climber 300 may be one specific example of an aeromechanical line climber 100 and may be substituted for aeromechanical line climber 100 in the discussions above. FIG. 3A is a top view of the aeromechanical line climber 300 in a zero pitch state of the lifting surface 301. FIG. 3B is a right side view of the aeromechanical line climber 300 in the zero pitch state of the lifting surface 301. FIG. 3C is a right side view of the aeromechanical line climber 300 in a pitched-up state of the lifting surface 301. FIG. 3D is a right side view of the aeromechanical line climber 300 in a pitched down state of the lifting surface 301. FIG. 3E is a close up view of a left side view of a portion of the aeromechanical line climber 300 center tail boom 302*b* area of the lifting surface 301 in the zero pitch state of the lifting surface 301. FIG. 3F is a close up view of a right side view of a portion of the aeromechanical line climber 300 center tail boom 302*b* area of the lifting surface 301 in the zero pitch state of the lifting surface 301. FIG. 3G is a close up view of the right side view of the portion of the aeromechanical line climber 300 center tail boom 302*b* area of the lifting surface 301 in the pitched down state of the lifting surface 301. FIG. 3H is a close up view of the right side view of the portion of the aeromechanical line climber 300 center tail boom 302*b* area of the lifting surface 301 in the pitched up state of the lifting surface 301.

The lifting surface 301 of the aeromechanical line climber 300 may be a snub nose cropped delta wing. The airfoil of the lifting surface 301 may be a symmetrical airfoil. The lifting surface 301 which may be connected to the center tail boom 302*b* by a hinged connection 350. The center tail boom 302*b* may connect to a center tail section 303*b*. The center tail section 303*b* may act as a vertical stabilizer providing directional stability to the aeromechanical line climber 300. Additionally, the center tail boom 302*b* and the center tail section 303*b* may shift the center of gravity of the aeromechanical line climber 300, such as to a point aft of the center of gravity of the lifting surface 301 itself and/or off of the lifting surface 301. For example, as illustrated in FIG. 3B, the lifting surface 301 may have a lifting center of pressure "LCP" at a position a distance D1' aft of the leading edge point "LEP" of the aeromechanical line climber 300. The position of the LCP may be governed by the configuration of the lifting surface 301 itself absent the attached tail booms, tail sections, and/or other elements of the aeromechanical line climber 300. The coupling of tail booms, tail section, and/or other elements of the aeromechanical line climber 300 to the lifting surface 301, such as tail booms 302*a-c*, tail sections 303*a-c*, etc., may shift the overall center of gravity "ACG" of the aeromechanical line climber 300 aft of the LCP. For example, the tail booms, tail section, and/or other elements of the aeromechanical line climber 300 may shift the ACG to be a distance D2' aft of the LEP, such that the ACG is aft of the LCP and between the pivot point "PP" of the aeromechanical line climber 300. In this manner, the ACG of the aeromechanical line climber 300 may be further aft on the aeromechanical line climber 300 than the LCP of the lifting surface 301 itself. In a similar manner, in alternative configurations, longer tail booms may shift the ACG a greater distance aft of the LEP such that the ACG is aft of the PP of the aeromechanical line climber 300. In such configurations, the ACG of the aeromechanical line climber 300 may be entirely off the lifting surface 301.

The center tail boom 302*b* may additionally include a line attachment system 304 configured to attach the aeromechanical line climber 300 to a tether, such as tether 103. In the configuration illustrated in FIGS. 3A-H, the lifting surface 301 may include a cut-out portion 360 enabling the lifting surface 301 to pivot relative to the center tail boom 302*b*. In the configuration illustrated in FIGS. 3A-H, the line attachment system 304 and hinged connection 350 are illustrated as separate elements on opposite sides of the center tail boom 302*b* (i.e., the right side for the hinged connection 350 and the left side for the line attachment system 304). However, the placement and configuration of the line attachment system 304 and hinged connection 350 may differ in various embodiments. For example, the line attachment system 304 and hinged connection 350 may be integrated together, the line attachment system 304 and hinged connection 350 may be individually or together located on the lifting surface 301, etc.

In the configuration illustrated in FIGS. 3A-H, the hinged connection 350 may include an upper mechanical stop 351*a*, a lower mechanical stop 351*b*, a hinge pin 352, and a hinge arm 355. However, the components and configuration of the hinged connection 350 may differ in various embodiments. The hinged connection 350 may be configured such that the hinge arm 355 pivots around the hinge pin 352 and the mechanical stops 351*a* and 351*b* interact with the hinge arm 355 to stop the rotation of the hinge arm 355 around the hinge pin 352. The hinge arm 355 may be affixed to the lifting surface 301.

The aeromechanical line climber 301 may include an instrument system 310, such as an instrument system including sensors for wind speed and direction, pressure, Global Positioning System (GPS), temperature, humidity, imagers, atmospheric particle detectors, and/or gas detectors, etc. The aeromechanical line climber 301 may include a power generation system to power such instruments of the instrument system 310, but may not include a power system that generates force to move the aeromechanical line climber 301 or that generates force to adjust aerodynamic properties of the aeromechanical line climber 301. In this manner, the ascent and descent of the aeromechanical line climber 300 may be unpowered. The instrument system 310 may be internal to the aeromechanical line climber 300, such as inside the lifting surface 301, and/or may be fully or partially external to the aeromechanical line climber 300. The instrument system 310 may be affixed to an external portion of the aeromechanical line climber 300, such as attached to a connection point on the lifting surface 301 and/or center tail boom 302*b*.

In an optional configuration, the aeromechanical line climber 300 may include additional booms and tail sections, such as a right side tail boom 302*c* and right side tail section 303*c* and a left side tail boom 302*a* and a left side tail section 303*a*. The side tail booms 302*a*, 302*c* may be rigidly connected to the lifting surface 301 and may pitch with the lifting surface 301 as the lifting surface 301 pivots at the hinged connection 350. The tail sections 303*a*, 303*c* may act as vertical stabilizers providing directional stability to the aeromechanical line climber 300. While three tail booms 302*a*, 302*b*, and 302*c* and three tail sections 303*a*, 303*b*, and 303*c* are illustrated for the aeromechanical line climber 300, tail booms and/or tail sections are optional and may not be present in various embodiments and/or tail booms and/or tail sections may be present in different numbers, such as one tail boom and/or tail section, two tail booms and/or tail sections, four tail booms and/or tail sections, etc.

FIG. 3E illustrates one example configuration of the line attachment system 304 in which opposite facing clips 390*a* and 390*b* are provided to clip to the tether, such as tether 103, thereby moveably affixing the aeromechanical line climber 300 to the tether. The view in FIG. 3E is inboard of the left side tail boom 302*a* and thus the left side tail boom 302*a* is not visible in FIG. 3E. The force of the clips 390*a* and 390*b* interacting on the tether, such as tether 103, may generally fix the orientation of the line attachment system 304, the center tail boom 302*b*, and the hinged connection 350, relative to the tether. The line attachment system 304 may moveably couple the aeromechanical line climber 300 to the tether, such as tether 103, such that the aeromechanical line climber 300 may move along the tether (e.g., ascend and/or descend the tether).

FIG. 3B is the right side view of the aeromechanical line climber 300 in the zero pitch state in which the hinged connection 350 is not rotated, FIG. 3E is a close up view of the left side view of a portion of the aeromechanical line climber 300 center tail boom 302*b* area of the lifting surface 301 in the same zero pitch state of the lifting surface 301, and FIG. 3F is a close up view of the right side view of a portion of the aeromechanical line climber 300 center tail boom 302*b* area of the lifting surface 301 in the same zero pitch state of the lifting surface 301. In the zero pitch state the hinge arm 355 of the hinge connection 350 may not interact with either of the mechanical stops 351*a*, 351*b*. The views in FIGS. 3F-H are inboard of the right side tail boom 302*c*, and thus the right side tail boom 302*c* is not visible in FIGS. 3F-H.

FIG. 3C is the right side view of the aeromechanical line climber 300 in the pitched up state in which the hinged connection 350 is rotated and FIG. 3H is a close up view of the right side view of a portion of the aeromechanical line climber 300 center tail boom 302*b* area of the lifting surface 301 in the same pitched up state of the lifting surface 301. In the pitched up state, the hinge arm 355 may have rotated around the hinge pin 352 until the hinge arm 355 mechanically interacted with the lower mechanical stop 351*b* stopping the pivot of the hinge arm 355.

FIG. 3D is the right side view of the aeromechanical line climber 300 in the pitched down state in which the hinged connection 350 is rotated and FIG. 3G is a close up view of the right side view of a portion of the aeromechanical line climber 300 center tail boom 302*b* area of the lifting surface 301 in the same pitched down state of the lifting surface 301. In the pitched down state, the hinge arm 355 may have rotated around the hinge pin 352 until the hinge arm 355 mechanically interacted with the upper mechanical stop 351*a* stopping the pivot of the hinge arm 355. The hinge arm 355 may freely rotate (or pivot) around the hinge pin 352 without any mechanical and/or electrical drive force imparted from an onboard system of the aeromechanical line climber 300. Rather, the direction of the lifting force on the lifting surface 301 and/or the mechanical force imparted by mechanical stops on the tether, such as stops 104*u*, 104*l* on the tether 103, may be the forces imparting the rotation to the hinge arm 355 and controlling the direction of rotation of the hinge arm 355 and the force of the mechanical stops 351*a*, 351*b* on the hinge arm may be the forces limiting the amount of rotation (or pivot) around the hinge pin 352 by the hinge arm 355. In this manner, the rotation and/or stop of rotation (or pivoting) of the hinge arm 355 and the lifting surface 301 may occur without any onboard system actively applying force to the aeromechanical line climber 300 and without any onboard system actively controlling the rotation (or pivot). Said another way, the hinged connection may be configured to be a passive rotation (or pivot) system without active control.

Figure 4A:
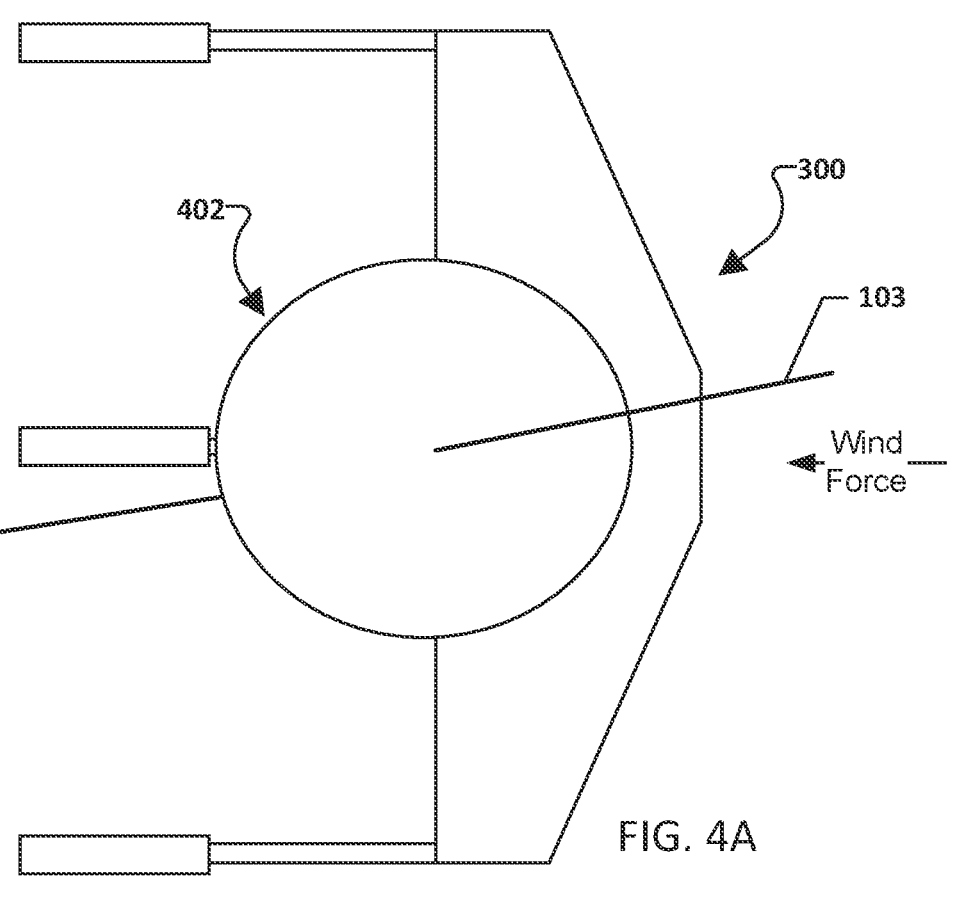
FIGS. 4A-4D are block diagrams illustrating aspects of an example aeromechanical line climber ascending and descending a line, or tether, fixed to an airborne platform in accordance with various embodiments.
Figure 4B:
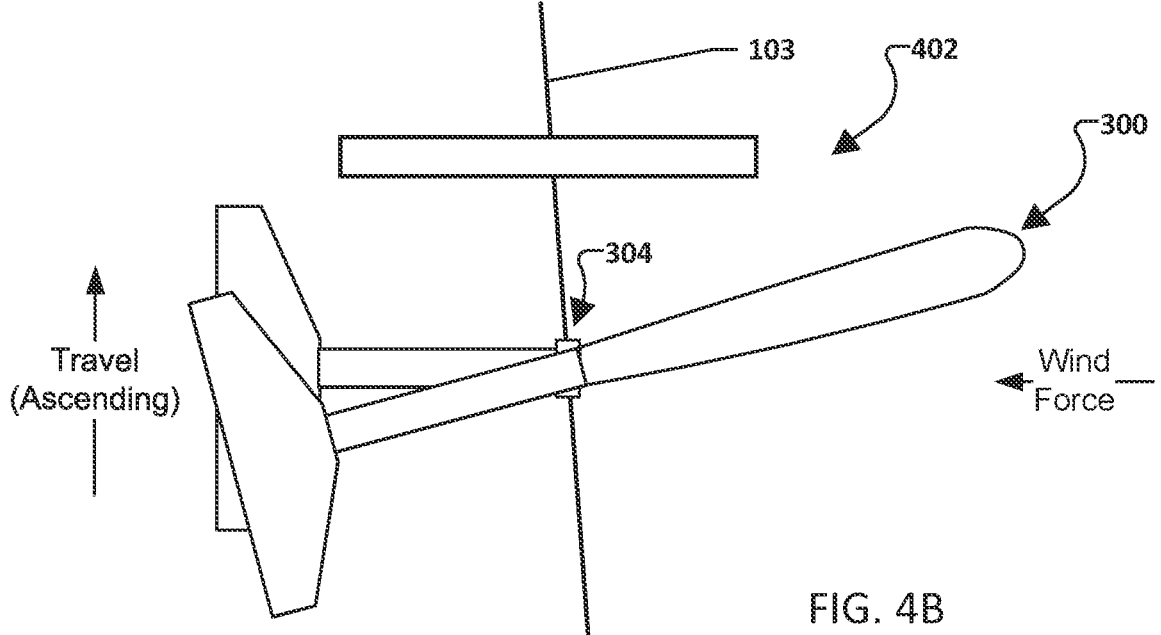
Figure 4C:
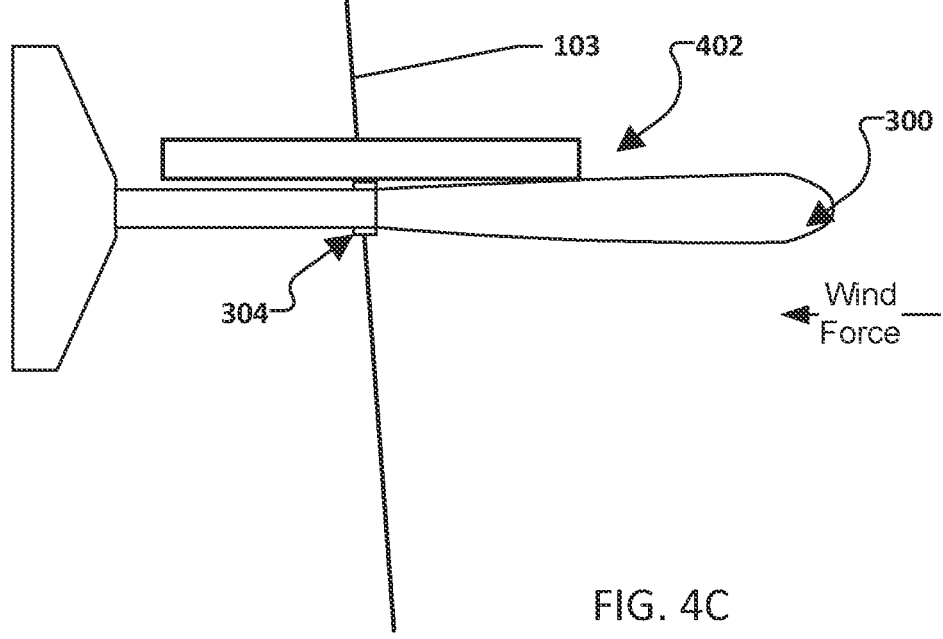
Figure 4D:
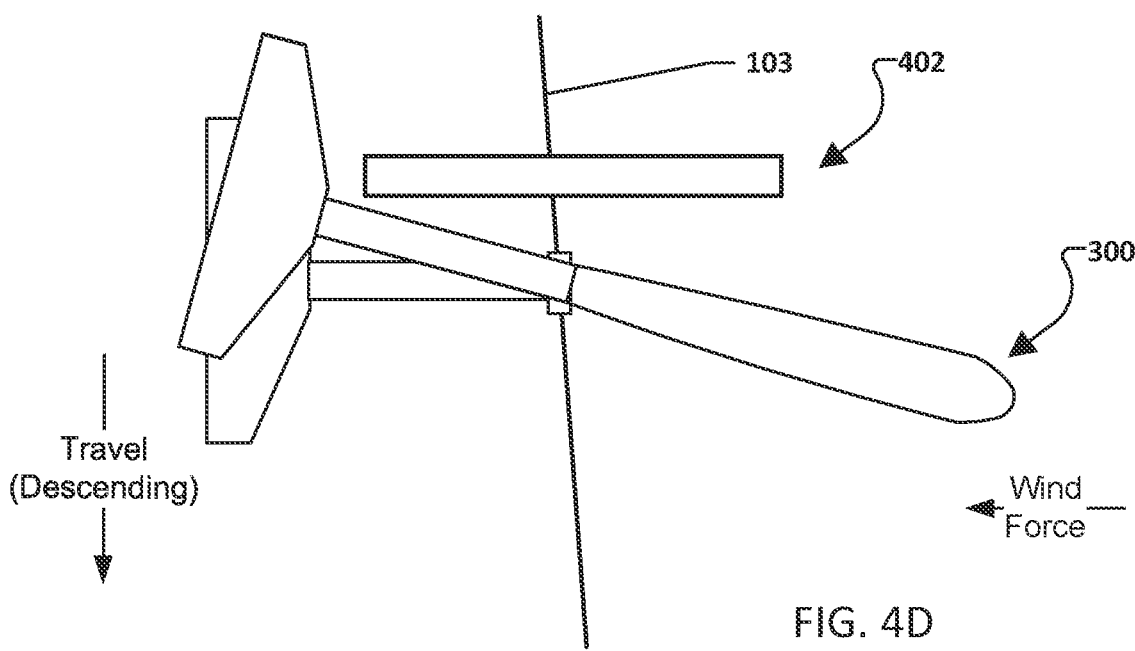

FIGS. 4A-4D are block diagrams illustrating aspects of the example aeromechanical line climber 300 ascending and descending the tether 103 in accordance with the various embodiments. With reference to FIGS. 1-4D, FIGS. 4A-4D illustrate an example tether mechanical stop configuration in which the mechanical stops of the tether 103 are disks. The disk 402 represents one example configuration of the upper mechanical stop 104*u*. Similarly, a lower mechanical stop 104*l* may also be a disk, such as disk 402. FIG. 4A is a top view of the aeromechanical line climber 300 in a zero pitch state of the lifting surface 301 seen from above the disk 402 acting as an upper mechanical stop. FIG. 4B is a right side view of the aeromechanical line climber 300 in the pitched up state of the lifting surface 301 traveling toward the disk 402, i.e., ascending the tether 103. FIG. 4C illustrates the right side view of the aeromechanical line climber 300 as it interacts with the disk 402. The disk 402 may exert force on the lifting surface 301 to pivot the lifting surface 301 and hinge arm 355 from the pitched up state through the zero pitch state. FIG. 4D illustrates the aeromechanical line climber 300 in the pitched down state after interacting with the disk 402. The change in angle of attack may cause the aeromechanical line climber 300 to travel away from the disk 302, i.e., descend the tether 103. Similar, but opposite, interactions of the aeromechanical line climber 300 and a disk 402 acting as a lower mechanical stop 104*l* may occur when the aeromechanical line climber 300 descends to the lower mechanical stop 104*l* down the tether 103.

Figure 5A:
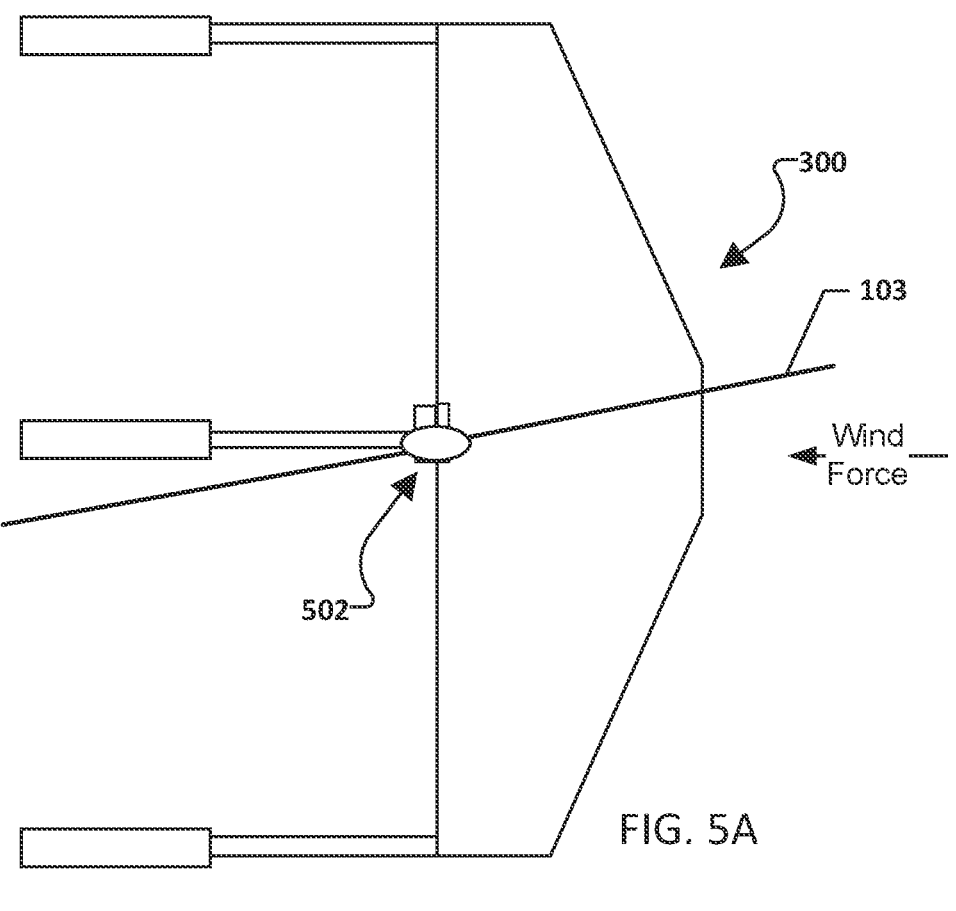
FIGS. 5A-5E are block diagrams illustrating aspects of an example aeromechanical line climber ascending and descending a line, or tether, fixed to an airborne platform in accordance with various embodiments.
Figure 5B:
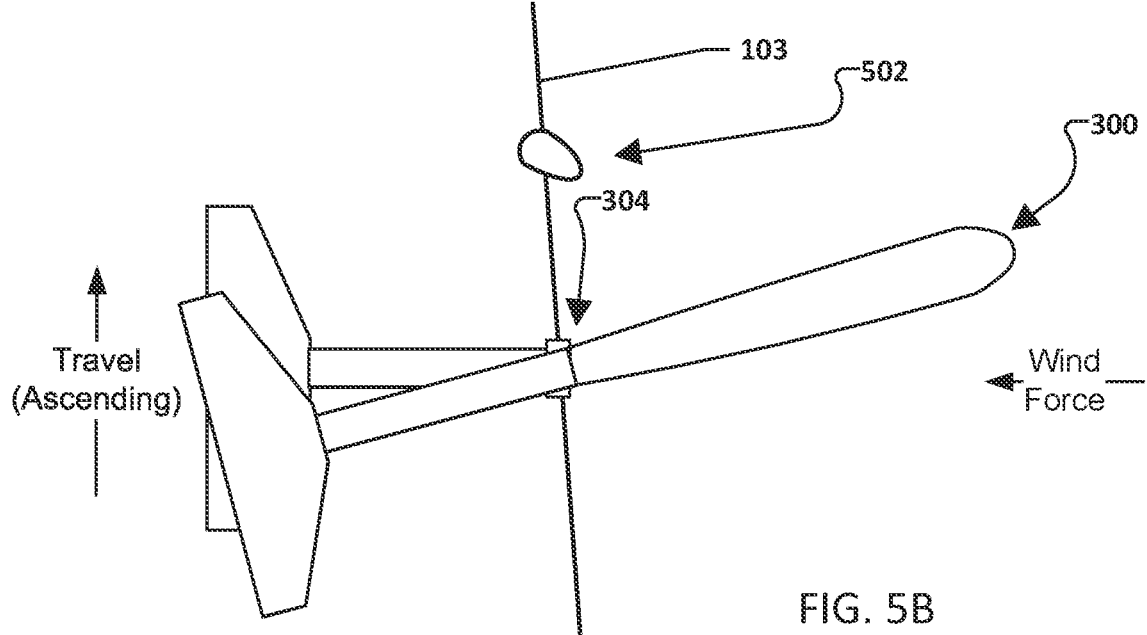
Figure 5C:
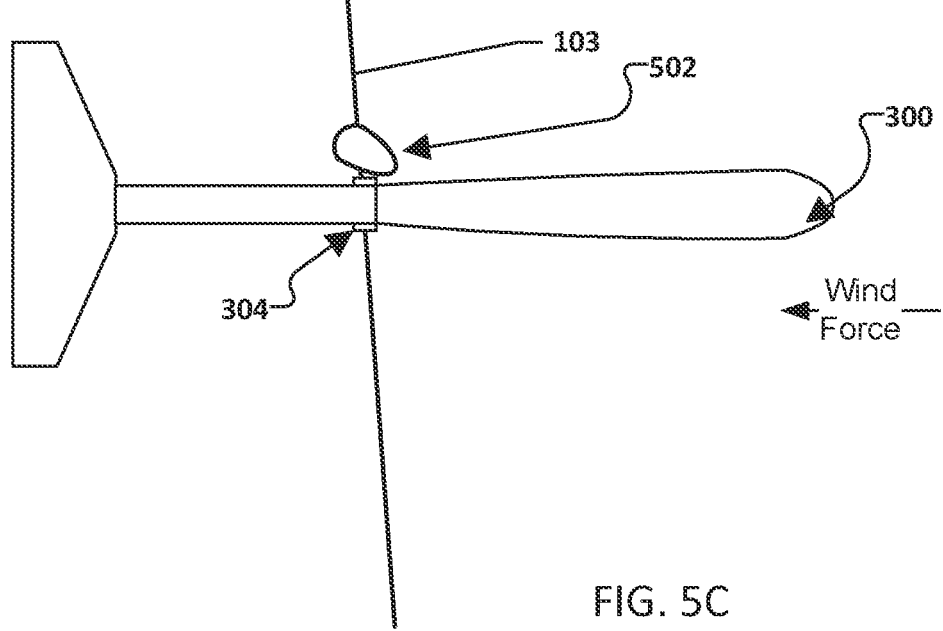
Figure 5D:
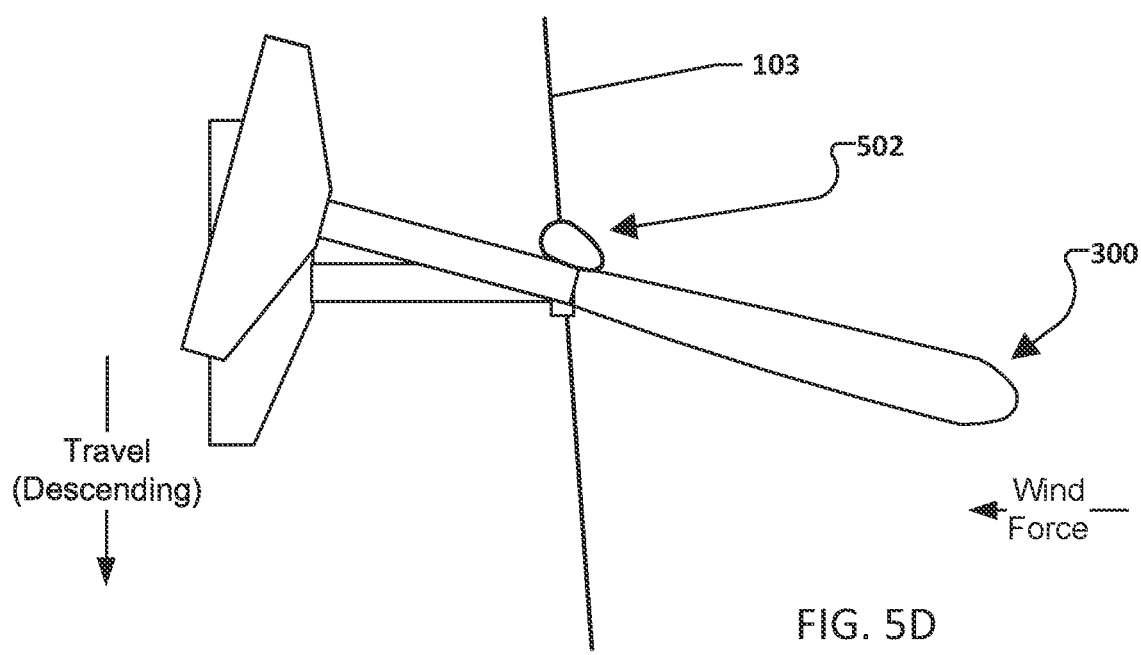
Figure 5E:
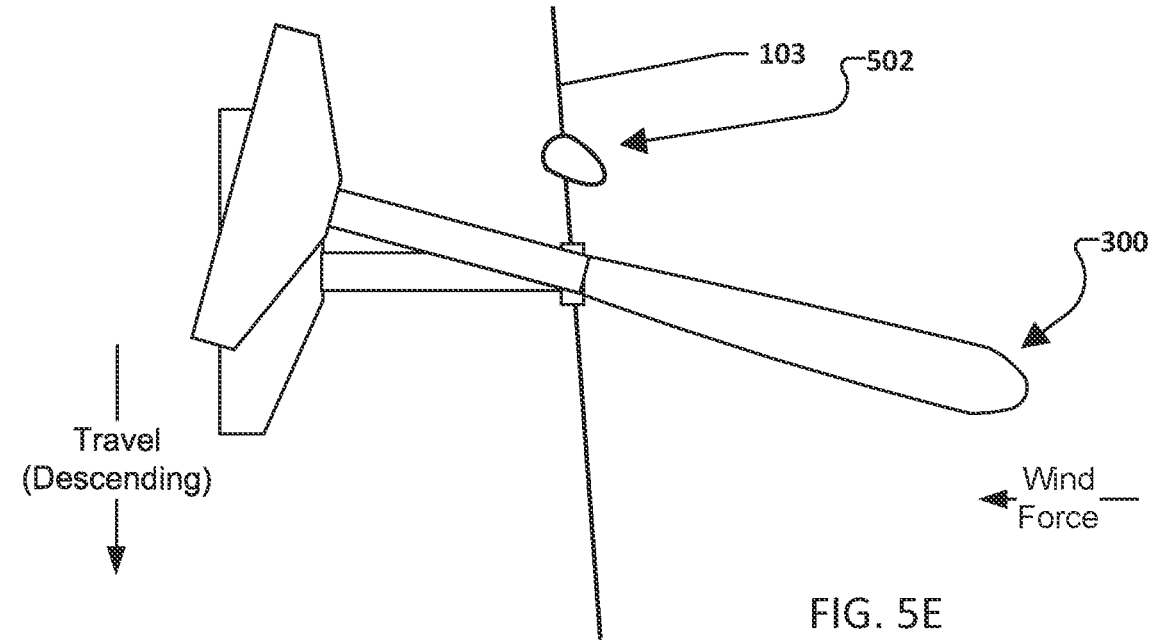

FIGS. 5A-5E are block diagrams illustrating aspects of the example aeromechanical line climber 300 ascending and descending the tether 103 in accordance with the various embodiments. With reference to FIGS. 1-5E, FIGS. 5A-5E illustrate an example tether mechanical stop configuration in which the mechanical stops of the tether 103 are cams. The cam 502 represents one example configuration of the upper mechanical stop 104*u*. The cam 502 may be oriented such that the lobe of the cam 502 points downward (e.g., toward the surface 106) when the cam 502 is acting as an upper mechanical stop 104*u*. Similarly, a lower mechanical stop 104*l* may also be a cam, such as cam 502, except that when the cam 502 is acting as a lower mechanical stop 104*l*, the cam 502 may be oriented such that the lobe of the cam 502 is pointing upward (e.g., toward the airborne platform 101). FIG. 5A is a top view of the aeromechanical line climber 300 in a zero pitch state of the lifting surface 301 seen from above the cam 502 acting as an upper mechanical stop. FIG. 5B is a right side view of the aeromechanical line climber 300 in the pitched up state of the lifting surface 301 traveling toward the cam 502, i.e., ascending the tether 103. FIGS. 5C and 5D illustrate the right side view of the aeromechanical line climber 300 as it interacts with the cam 502. The cam 502 may exert force on the lifting surface 301 and/or hinged connection 350 to pivot the lifting surface 301 and hinge arm 355 from the pitched up state through the zero pitch state. FIG. 5E illustrates the aeromechanical line climber 300 in the pitched down state after interacting with the cam 502. The change in angle of attack may cause the aeromechanical line climber 300 to travel away from the cam 502, i.e., descend the tether 103. Similar, but opposite, interactions of the aeromechanical line climber 300 and a cam 502 acting as a lower mechanical stop 104*l* may occur when the aeromechanical line climber 300 descends to the lower mechanical stop 104*l* down the tether 103.

Figure 6:
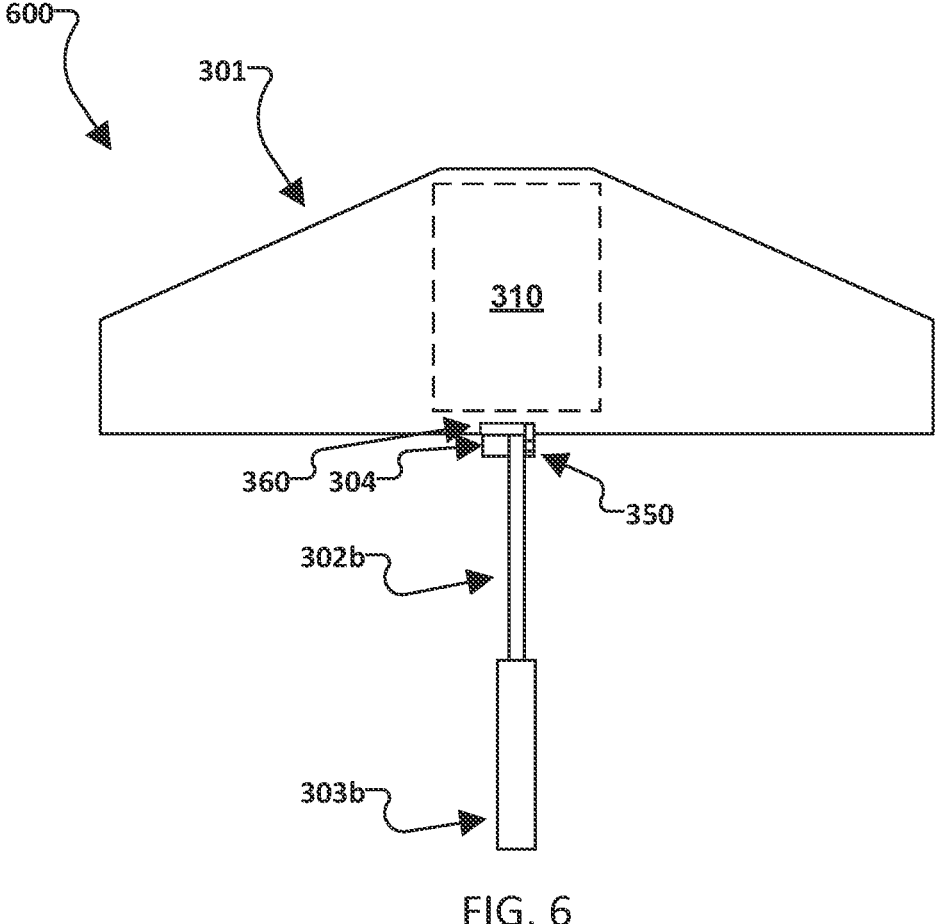
FIG. 6 is a block diagram of an example aeromechanical line climber in accordance with various embodiments.

FIG. 6 is a block diagram of an example aeromechanical line climber 600 in accordance with various embodiments. With reference to FIGS. 1-6, the aeromechanical line climber 600 may be similar to aeromechanical line climber 300, except that only center tail boom 302*b* and center tail section 303*b*. As discussed above, tail booms and/or tail sections may be optional features of embodiment aeromechanical line climbers. The various embodiments are not limited by any tail boom or tail section requirements. As examples, no tail boom or tail section may be present in some embodiments (for example as illustrated in FIGS. 1-2F), a single tail boom and tail structure may be present in some embodiments (for example as illustrated in FIG. 6), or multiple tail booms and tail structures may be present in some embodiments (for example as illustrated in FIGS. 3A-5E).

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein. The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

What is claimed is:

1. An airborne system, comprising:
    an airborne platform;
    an anchor system positioned on a first surface;
    a tether connected to the airborne platform and to the anchor system;
    an upper mechanical stop connected to the tether;
    a lower mechanical stop connected to the tether; and
    an aeromechanical line climber having a lifting surface and a pivot point, the lifting surface having a leading edge, the aeromechanical line climber is configured to moveably couple to the tether between the upper mechanical stop and the lower mechanical stop,
    wherein, when the airborne platform is supporting the tether aloft above the first surface a and the aeromechanical line climber is coupled to the tether and aloft above the first surface, the aeromechanical line climber is configured to repeatedly ascend and descend the tether relative to the first surface between the upper mechanical stop and the lower mechanical stop in response to a lifting force acting on the aeromechanical line climber and mechanical forces generated by interactions of the aeromechanical line climber with the upper mechanical stop and the lower mechanical stop,
    wherein the airborne platform and the anchor system are controlled based on attachment to the tether with said upper mechanical stop, a tether length "tL", and a line angle θ, wherein the upper mechanical stop is held at a selected upper altitude (uA) representing a selected highest climb altitude for the aeromechanical line climber above the lifting surface, and the airborne platform and anchor system are controlled based on attachment to the tether of the lower mechanical stop, the tether length "tL", and the line angle θ,
    wherein the aeromechanical line climber in a first position has the leading edge of the lifting surface pitched up away from the first surface such that the aeromechanical line climber is configured to climb the tether toward the upper mechanical stop, and
    wherein the aeromechanical line climber in a second position has the leading edge of the lifting surface pitched down toward the first surface such that the aeromechanical line climber is configured to descend the tether toward the lower mechanical stop, wherein the pivot point is located aft of the lifting surface on the aeromechanical line climber in the second position.

2. The system of claim 1, wherein the repeated ascension and descension of the aeromechanical line climber is achieved without input force created by a power generation system.

3. The system of claim 2, wherein the repeated ascension and descension of the aeromechanical line climber is achieved without input force controlled by an active control system.

4. The system of claim 3, wherein the airborne platform is a balloon.

5. The system of claim 3, wherein the airborne platform is a kite.

6. The system of claim 3, wherein the upper mechanical stop and the lower mechanical stops are disks.

7. The system of claim 3, wherein the upper mechanical stop and the lower mechanical stops are cams.

8. The system of claim 3, wherein the aeromechanical line climber comprises:
    a line attachment system configured to moveably couple the aeromechanical line climber to the tether; and
    a hinged connection configured to enable the lifting surface to pivot and change an angle of attack of the lifting surface relative to the first surface when the aeromechanical line climber is aloft above the first surface.

9. The system of claim 8, wherein the change in the angle of attack changes a direction of the lifting force acting on the aeromechanical line climber relative to the first surface when the aeromechanical line climber is aloft above the first surface.

10. The system of claim 9, wherein the aeromechanical line climber further comprises:

at least one tail boom connected to the line attachment system and the hinged connection; and a tail connected to the at least one tail boom.

11. The system of claim 10, wherein the aeromechanical line climber is configured such that a center of gravity of the aeromechanical line climber is aft of a lifting center of pressure of the lifting surface.

12. The system of claim 9, wherein the hinged connection comprises two mechanical stops configured to control the pivot and change of the angle of attack of the lifting surface.

13. An aeromechanical line climber, comprising:

a lifting surface having a leading edge;

a line attachment system configured to moveably couple the aeromechanical line climber to a tether; and a hinged connection configured to enable the lifting surface to pivot and change an angle of attack of the lifting surface when the aeromechanical line climber is coupled to the tether and aloft between an upper mechanical stop on the tether and a lower mechanical stop on the tether, wherein, while the aeromechanical line climber is coupled to the tether and aloft between the upper mechanical stop on the tether and the lower mechanical stop on the tether, wherein the aeromechanical line climber is configured to repeatedly ascend and descend the tether between the upper mechanical stop and the lower mechanical stop in response to a lifting force acting on the lifting surface and mechanical forces generated by interactions of the aeromechanical line climber with the upper mechanical stop and the lower mechanical stop, wherein the aeromechanical line climber in a first position has the leading edge of the lifting surface pitched up away from the lower mechanical stop such that the aeromechanical line climber is configured to climb the tether toward the upper mechanical stop, wherein the aeromechanical line climber in a second position has the leading edge of the lifting surface pitched down away from the upper mechanical stop such that the aeromechanical line climber is configured to descend the tether toward the lower mechanical stop, and a wherein the hinged connection is located aft of the lifting surface in the second position.

14. The aeromechanical line climber of claim 13, wherein the aeromechanical line climber does not include a power generation system providing input force to the ascension and the descension of the aeromechanical line climber and the aeromechanical line climber does not include an active control system controlling the ascension and the descension of the aeromechanical line climber.

15. The aeromechanical line climber of claim 14, wherein the upper mechanical stop and the lower mechanical stops are disks or cams.

16. The aeromechanical line climber of claim 15, further comprising:

at least one tail boom connected to the line attachment system and the hinged connection; and a tail connected to the at least one tail boom.

17. The aeromechanical line climber of claim 16, wherein the aeromechanical line climber is configured such that a center of gravity of the aeromechanical line climber is aft of a lifting center of pressure of the lifting surface.

18. The aeromechanical line climber of claim 17, wherein the hinged connection comprises two mechanical stops configured to control the pivot and change of the angle of attack of the lifting surface.

* * * * *